US007892092B2

(12) United States Patent
Matthews et al.

(10) Patent No.: US 7,892,092 B2
(45) Date of Patent: Feb. 22, 2011

(54) PERSISTENT THEMED BONUS AWARDS FOR GAMING MACHINES

(75) Inventors: Thomas J. Matthews, Las Vegas, NV (US); Richard E. Rowe, Incline Village, NV (US)

(73) Assignee: IGT, Reno, NV (US)

( * ) Notice: Subject to any disclaimer, the term of this patent is extended or adjusted under 35 U.S.C. 154(b) by 1243 days.

(21) Appl. No.: 11/038,330

(22) Filed: Jan. 18, 2005

(65) Prior Publication Data

US 2006/0160620 A1 Jul. 20, 2006

(51) Int. Cl.
*A63F 9/24* (2006.01)
*A63F 13/00* (2006.01)

(52) U.S. Cl. ............................ 463/25; 463/16; 463/20; 463/42

(58) Field of Classification Search .................. 463/25, 463/42–43, 16–20
See application file for complete search history.

(56) References Cited

U.S. PATENT DOCUMENTS 5,655,961 A 8/1997 Acres et al.
6,068,552 A * 5/2000 Walker et al. ................. 463/21
6,165,071 A 12/2000 Weiss
6,227,972 B1 * 5/2001 Walker et al. ................. 463/25
6,319,125 B1 11/2001 Acres
6,364,768 B1 4/2002 Acres et al.
6,394,907 B1 5/2002 Rowe
6,468,156 B1 10/2002 Hughs-Baird et al.
6,722,985 B2 4/2004 Criss-Puszkiewicz et al.
2002/0077173 A1 * 6/2002 Luciano et al. ............... 463/25
2004/0023709 A1 2/2004 Beaulieu et al.

FOREIGN PATENT DOCUMENTS

WO 03025828 3/2003
WO WO03025828 * 3/2003
WO 2004090823 10/2004

OTHER PUBLICATIONS

International Search Report and Written Opinion from Corresponding International Application No. PCT/US2005/047251.
Office Action dated Nov. 7, 2008 for related Chinese Patent Application No. 200580046057.4.
Second Office Action dated Mar. 29, 2010 for related Chinese Patent Application No. 200580046057.4.

* cited by examiner

*Primary Examiner*—Peter DungBa Vo
*Assistant Examiner*—Jasson H Yoo
(74) *Attorney, Agent, or Firm*—Weaver Austin Villeneuve & Sampson LLP

(57) ABSTRACT

Systems and methods for awarding bonuses associated with gaming machines are disclosed. A bonus system host generates and transmits bonus event information to a gaming machine for display. The bonus system can be associated with a player tracking network including a remote player tracking host and a player tracking device at a gaming machine, which can include a controller and display. Alternatively, no player tracking device exists at the gaming machine, and bonus information is sent to a display on the gaming machine itself. A bonus can be awarded independent of the outcome of play on the gaming machine, and can be a themed bonus. Bonus event results for a specific player can be carried over to a following instance of a game played by that specific player. One form of bonus can be improved pay tables, with odds calculated as a function of player play within the bonus system.

20 Claims, 7 Drawing Sheets

PERSISTENT THEMED BONUS AWARDS FOR GAMING MACHINES

CROSS-REFERENCE TO RELATED APPLICATIONS

The present application is generally related to co-pending U.S. patent application No. 10/242,559, filed Sep. 11, 2002, and Ser. No. 09/965,786, filed Sep. 27, 2001, both of which are commonly assigned, and both of which are hereby incorporated by reference in their entirety and for all purposes.

TECHNICAL FIELD

The present invention relates generally to gaming machines such as a slot machines, video poker machines and the like, and more specifically to systems and methods for awarding bonuses associated with gaming machines.

BACKGROUND

Casinos and other forms of gaming comprise a growing multi-billion dollar industry wherein floor space can be at a premium, such that newer and increasingly sophisticated games and machines are preferred over older and less sophisticated ones. As a general example, the casino and gaming industries have experienced a marked shift over the past few decades from the use of fully mechanical gaming machines to electronic and microprocessor based gaming machines. In a typical gaming machine, such as a video poker or slot machine, a game play is first initiated through a player wager of money or credit, whereupon the gaming machine determines a game outcome, presents the game outcome to the player and then potentially dispenses an award of some type, including a monetary award, depending on the game outcome. Although this process is generally true for both mechanical and electronic gaming machines, the electronic machines tend to be more popular with players and thus more lucrative for casinos for a number of reasons, such as increased game varieties, more attractive and dynamic video and audio presentations, and the ability to award larger jackpots.

Electronic and microprocessor based gaming machines typically include a number of hardware and software components to provide a wide variety of game types and game playing capabilities, with such hardware and software components being generally well known in the art. A typical electronic gaming machine comprises a central processing unit (CPU) or master gaming controller (MGC), which is usually located in a main cabinet of the gaming machine, and which typically controls various combinations of hardware and software components, devices and peripherals that encourage game play, allow a player to play a game on the gaming machine and control payouts and other awards. Software components can include, for example, boot and initialization routines, various game play programs and subroutines, credit and payout routines, image and audio generation programs, various component modules and a random number generator, among others.

Exemplary hardware devices can include various inputs that accept money and/or credits into the gaming machine, such as bill validators, coin acceptors, card readers and ticket acceptors, as well as user inputs to determine a wager amount and initiate game play, such as keypads, buttons, levers, touch screens and the like. Other common hardware devices include payout components such as coin hoppers and ticket printers, as well as player tracking units. In addition, any given gaming machine will typically have any number of audio and video display components that can include, for example, various speakers, visual display panels, belly and top glasses, exterior cabinet artwork, lights, top box dioramas, and cathode ray tubes, liquid crystal displays (LCDs), flat panels and/or other similar video displays for displaying game play and other assorted information. Many of these peripheral components and devices are built into a main cabinet of the gaming machine itself or into items closely associated with the gaming machine, such as a top box, which usually sits atop the main cabinet.

One way of attracting and retaining players with improved games and gaming machines is to present new and varying award schemes, such as larger jackpots or payouts or more winning combinations. A particular type of award scheme that is attractive to game players is a bonus scheme. In general, a bonus award to a player is one that is made above and beyond a normal award that may be received by playing a given game. For example, in the well known WHEEL OF FORTUNE® game manufactured by IGT of Reno, Nevada, a player plays a base game where the player is paid a reward or payout whenever the result is one of a predetermined number of winning outcomes. In addition, if a certain result is obtained while playing the base game, then the player is provided an opportunity to spin a bonus wheel and win a bonus payout, which is in addition to any reward or payout for receiving a winning result of the base game. Under such an arrangement, however, the ability to win a bonus is typically linked to a specific outcome of a game. In the event that the game does not result in a particular type of outcome, then the player cannot win a bonus. Such a limitation might result in a lessened appeal for some players.

Accordingly, there exists a desire for improved systems and methods for awarding bonuses associated with gaming machines, and in particular for such systems and methods to involve bonuses that are either not tied to specific game results or are otherwise varied over existing bonus schemes.

SUMMARY

It is an advantage of the present invention to provide unique systems and methods for deriving, presenting and awarding gaming machine bonuses. This is accomplished at least in part by awarding bonuses in association with play on a gaming machine, where such bonuses are either not tied to specific game results or are otherwise unique in light of existing gaming machine and system bonus schemes.

According to one embodiment, the eligibility of one or more players to participate in a bonus event is determined by application of one or more criteria, which can include the use of a player tracking device associated with a game or gaming device. In one embodiment, the eligibility comprises the identification of a player via use of such a player tracking device. It is also determined if one or more of the eligible players are the winner of the bonus event and thus entitled to a bonus. Preferably, the winner or winners of the bonus are determined by application of one or more criteria to the one or more eligible players. In one embodiment, the criteria for winning the bonus are independent of the specific outcome of a game being played by a player. In other words, a player need not receive a particular outcome while playing a game in order to be entitled to win the bonus. If a player is a winner of a bonus, the player is provided notice of such and the bonus is awarded. A bonus may be awarded among many ways, including issuing a receipt or voucher, providing credit to the gaming device the player is playing, or paying coins from the device to the player.

In one embodiment, the bonus system comprises at least a portion of an existing system or network, such as a player tracking system, which may have a variety of configurations. The player tracking system may comprise a player tracking device at the gaming machine, a remote player tracking host and a network by which information may be sent to and from the player tracking device and player tracking host. The player tracking device may include a player tracking device controller and one or more peripherals, such as a card reader, display, keyboard, printer and speaker. In one embodiment, the bonus system includes a bonus system host associated with the player tracking network. The bonus system host may comprise a computing device, and may actually be the same device as the player tracking host. The bonus system host is arranged to determine the eligibility of players to participate in a bonus event and to determine the winner or winners of the bonus event. This configuration may be achieved by hardware and/or software, such as computer executable program code. The bonus system host can also be arranged to generate bonus event information such as information regarding how a particular bonus will be awarded, and bonus win information. Such information may be transmitted to the player tracking device via the network. Bonus event information is displayed and audible or visible information is generated in response to the sending of bonus event information from the bonus event host to the player tracking device controller.

According to one embodiment, the provided system and method involve a bonus system, a player tracking system, or both, and involve at least one gaming machine adapted for accepting wagers, granting monetary awards and presenting a game for play. Such a system or gaming machine can include a player tracking device including at least one input configured to receive information regarding a player of the gaming machine, an associated display device adapted to present bonus information to the player, a bonus system host arranged to accept player information and transmit bonus information, a bonus processor adapted to generate bonus event results, and a communications link adapted to transmit information between the player tracking device and bonus system host. At least a portion of the bonus event results is dependent upon the identity or another traceable characteristic of the specific player.

Various detailed embodiments may include a player tracking controller adapted to execute bonus event instructions, which controller can be located at the bonus system host or at the gaming machine, such that bonus event results can be generated at a remote location or at the gaming machine. A communications network encompassing the communications link can be included. Such a network can include a plurality of player tracking devices associated with a plurality of gaming machines, each of which is also associated with the bonus system host, a player tracking host, or both. Such varying embodiments can also include a bonus system that is adapted to generate bonus event information, such as bonus event results, independent of the outcome of a game presented on the gaming machine. The bonus host, a player tracking host, a particular gaming machine, or any combination thereof, may comprise a database arranged to store data regarding the activities of one or more players of one or more gaming machines in the system. Further, the display device for displaying bonus information to the player can be located on the gaming machine, on the player tracking device, or any other suitable location.

Under other embodiments of the present invention, various methods can include steps of providing a bonus host adapted to process and store information specific to a player of a gaming machine, providing a communications link adapted to transmit information between the bonus host and gaming machines, accepting information regarding the player, transmitting bonus event information from the bonus host to the gaming machine over the communications link, generating bonus event results that are substantially dependent upon the identity of the player, and presenting the bonus event results to the player at the gaming machine. Of course, a plurality of players, systems, bonus hosts, gaming machines, communications links and bonus event results can be used. As in many of the disclosed systems and methods, the bonus event results can be personal to a given player, can persist to the next instance that the player plays a game associated with a given bonus host, and can be themed. In addition, the persistent bonus can be continued to a game played at the same gaming machine or at a second gaming machine separate from the first gaming machine.

According to another embodiment of the present invention, which may include one or more features of the foregoing embodiments, bonus event results specific to a given player can persist to the next instance that the given player plays a game associated with the bonus system. Such a next instance can be at the same gaming machine at a later time or date, or can be at another gaming machine separate from the originally played gaming machine. In such cases, bonus event results can be personal, such that each player has his or her own set or sets of ongoing persistent bonus event results. Such a persistent bonus can also be themed, such that an ongoing persistent bonus game can have a baseball “World Series,” “Formula 1” racing series or other similarly themed feel. Accordingly, various stages, tasks, levels of advancement or progress and corresponding awards and prize levels can accrue and be recorded or saved for future sessions, depending on the individual progress of any particular player within the persistent bonus system. The performance of various specific players can be communicated to other players through a mechanism such as a leader board, ultimately enabling players to play against each other for the best performance record.

Other methods, features and advantages of the invention will be or will become apparent to one with skill in the art upon examination of the following figures and detailed description. It is intended that all such additional methods, features and advantages be included within this description, be within the scope of the invention, and be protected by the accompanying claims.

BRIEF DESCRIPTION OF THE DRAWINGS

The included drawings are for illustrative purposes and serve only to provide examples of possible structures and elements for the disclosed inventive bonusing systems and methods. These drawings in no way limit any changes in form and detail that may be made to the invention by one skilled in the art without departing from the spirit and scope of the invention.

DETAILED DESCRIPTION

Figure 1A:
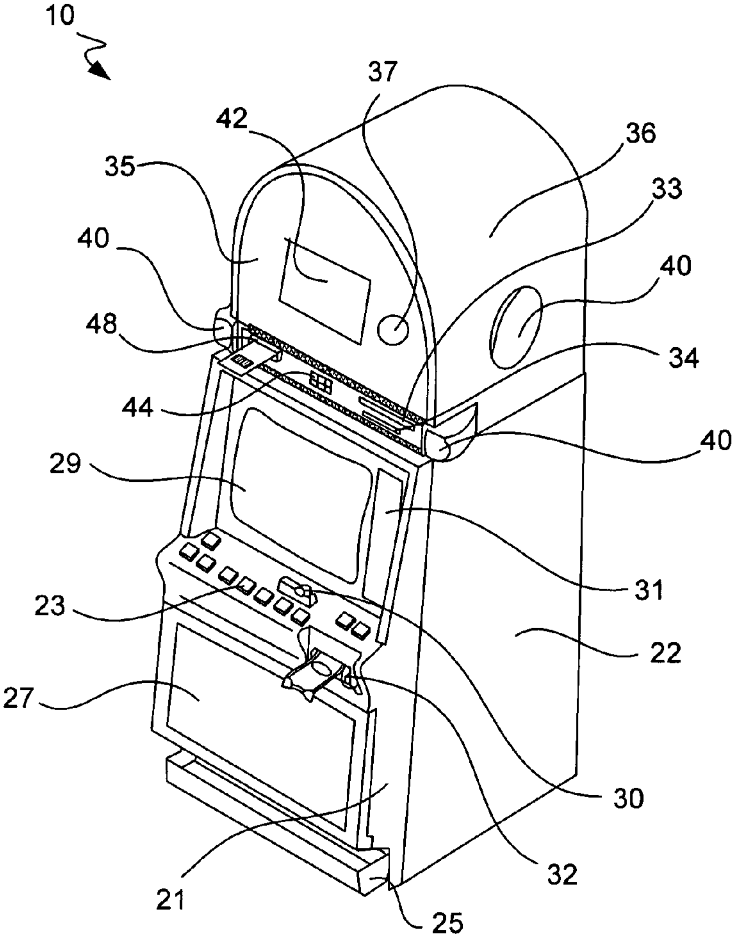
FIG. 1A illustrates in perspective view an exemplary gaming machine adapted to present and award a bonus according to one embodiment of the present invention.

Exemplary applications of systems and methods according to the present invention are described in this section. These examples are being provided solely to add context and aid in the understanding of the invention. It will thus be apparent to one skilled in the art that the present invention may be practiced without some or all of these specific details. In other instances, well known process steps have not been described in detail in order to avoid unnecessarily obscuring the present invention. Other applications are possible, such that the following example should not be taken as definitive or limiting either in scope or setting.

In the following detailed description, references are made to the accompanying drawings, which form a part of the description and in which are shown, by way of illustration, specific embodiments of the present invention. Although these embodiments are described in sufficient detail to enable one skilled in the art to practice the invention, it is understood that these examples are not limiting; such that other embodiments may be used, and changes may be made without departing from the spirit and scope of the invention.

In general, the present invention relates to a bonus system and a method of awarding a bonus in association with play on a gaming machine. By the term "bonus," it is meant an award, reward or the like. Such a bonus may have a variety of forms, including money, prizes such as tangible goods or free or reduced price goods or services, or points or other representative elements (tangible or intangible), which may be redeemed for goods, services and/or money. In general, the term "bonus" as used herein means an award, reward or the like which is provided other than as a normal result of a winning outcome of the play of a game on a gaming machine.

As an introduction to the various embodiments described herein, two very specific examples under particular implementations according to the present invention will now be provided. It will be readily appreciated that the following examples are merely two picked from a potentially infinite number of possibilities that may occur under the present invention, such that these examples is not limiting in any way.

According to a first example, Player X is a player that has registered or otherwise checked in with an existing player account under an implemented persistent themed bonus system. On a given day, Player X enters Casino A and begins play on a first gaming machine. At an appropriate time, Player X indicates that he would like to dedicate game play at this gaming machine to the "World Series" persistent bonus game under which Player X has a previously saved game or progress. Player X plays at this first gaming machine for about 30 minutes, during which time he is awarded or otherwise achieves two instances of play within the World Series game, recording a triple and a strikeout while batting. Player X then departs for a meal, and returns to Casino A at a later time that day to resume play.

At this later time, Player X begins game play on a second gaming machine separate from the earlier first gaming machine, and elects to continue play under his previous World Series game. As in the earlier instance, his previous results and status persist to this later gaming session, and are thus loaded into the system so that the bonus game can continue. Player X immediately records a single during his first instance of bonus play, thus scoring the runner from his previous triple and earning Player X a relatively minor "immediate win" bonus for scoring a run. During the next 30 minutes of this continuing session at the second gaming machine, Player X is awarded or otherwise achieves another six instances of bonus play, during which time he records two more outs to proceed to the next half-inning, three strikeouts of the opposing team while on defense, and a Home Run when batting again, to earn a larger "immediate win" bonus while back on offense. Player X then ends his gaming session with the score of the game being 2-0 in the fourth inning. Since Player X has been having a winning season and will earn a relatively large "long term themed win" bonus for ultimately winning this game and qualifying for the playoffs, Player X will likely be back for more play later this same day or week.

According to a second example, Player Y is a player that has similarly registered or otherwise checked in with an existing player account under a persistent themed bonus system. On a given Day 1, Player Y enters Casino B and begins play on a gaming machine within Casino B. At an appropriate time, Player Y indicates that she would like to dedicate game play at this gaming machine to an "Antiques Roadshow" persistent bonus game. Since Player Y has never played under this bonus game before, she goes through a brief sign up procedure to play this particular themed bonus game, and then begins play. This sign up includes a notice that funds to pay the bonus game may be taken as a percentage of income received to play the regular game on the gaming machine. Player Y plays at this gaming machine for about one hour, during which time she is awarded five instances of play within the Antiques Roadshow game, recording two "no-finders," an unthemed "Instant Win" of $100, and an "introductory find" of a worn 50s era jukebox, resulting in a relatively minor "immediate win." Player Y is then done playing for the day and departs.

On a subsequent Day 2, which can actually be months or years after the previous Day 1, Player Y enters Casino C and begins play on a gaming machine within Casino C. At an appropriate time, Player Y indicates that she would like to dedicate game play at this gaming machine to her "Antiques Roadshow" persistent bonus game that she had started during the previous Day 1. Her previously saved progress is loaded into the system and she then continues play under this persistent themed bonus game. After the first hour, Player Y decides to switch gaming machines. At the next gaming machine, Player Y passes on the option to continue play under her saved "Antiques Roadshow" game, but rather elects to play under a football "Super Bowl" persistent bonus game. Since Player Y had previously played under this persistent themed bonus game, her previous progress is loaded into the system, and she proceeds to continue her progress playing under this bonus game. After some time, Player Y scores a touchdown during an instance of bonus game play, and is awarded a desirable "immediate win" bonus of an improved regular game pay table for the next 30 minutes of regular game play on that gaming machine. Although Player Y may have ended play at that gaming machine sooner than that, she is inclined to continue play under the temporarily improved pay table that has a player return rate of 120%. After earning nine more instances of bonus game play during a particularly lucky streak over the next hour, Player Y finally ends her gaming session with the score of the football game being 24-3 in the third quarter. As always, this progress is then saved for the next time that Player Y plays the "Super Bowl" persistent bonus game.

Again, the foregoing examples represent only a few of the myriad possible outcomes and arrangements of play under a persistent bonus system or method. The following description will now provide for other possibilities and implementations of these and other such bonus systems and methods at varying levels. First, examples of generic gaming machines, player tracking devices and hardware for both are provided. Next, exemplary gaming systems and network configurations are given. A short example of a player information database then follows, with further details as to possible content for such a database being discussed in later sections. A general section on bonuses and potential bonus funding options is then provided, after which further detailed content and examples for persistent and themed bonuses is given. Finally, examples of particular awards relating to improved pay tables are provided.

Gaming Machine and Player Tracking Hardware

Turning now to FIG. 1A, an exemplary gaming machine adapted to accept a wager, play a game, award a winning, and present and award a bonus according to one embodiment of the present invention is illustrated in perspective view. Gaming machine 10 includes major components such as a top box 36 and a main cabinet 22, which generally surrounds the machine interior (not shown) and is viewable by users. Main cabinet 22 includes a main door 21 on the front of the machine, which opens to provide access to the machine interior. Attached to the main door are various items, which can include, for example, one or more player-input switches or buttons 23, one or more money or credit acceptors, such as a coin acceptor 30, and a bill or ticket validator 32, a coin tray 25, and a belly glass 27. Viewable through main door 21 is a primary video display 29 and one or more information panels 31. The primary video display 29 can be a cathode ray tube, high resolution flat-panel LCD, plasma/LED display or other conventional electronically controlled video monitor. Top box 36, which typically rests atop of the main cabinet 22, may also contain various items, such as a ticket printer 48, a key pad 44, one or more additional displays 33, a card reader 34, one or more speakers 40, a top glass 35, one or more cameras 37, and a secondary video display 42, which may also be a cathode ray tube, high resolution flat-panel LCD, plasma/LED display or other conventional monitor.

In a preferred embodiment, gaming machine 10 is also associated with a player tracking system. Such a system may also be referred to as a player reward or player loyalty system. In general the player tracking system includes at least one gaming machine player tracking device associated with a player tracking host system via a network including a communication link. One arrangement of such a gaming machine player tracking device is also illustrated in FIG. 1A. As illustrated, the player tracking device is associated with several items on or about top box 36. Of course, top box 36 may have a variety of shapes and sizes, any of which are contemplated for use with the present invention. Generally, top box 36 defines an interior space in which one or more components are located. Items that can be associated with a localized player tracking unit at gaming machine 10 can include, for example, the ticket printer 48, key pad 44, one or more additional displays 33, card reader 34, one or more speakers 40, and secondary video display 42, the use and implementation of which will be readily appreciated by those skilled in the art.

Figure 1B:
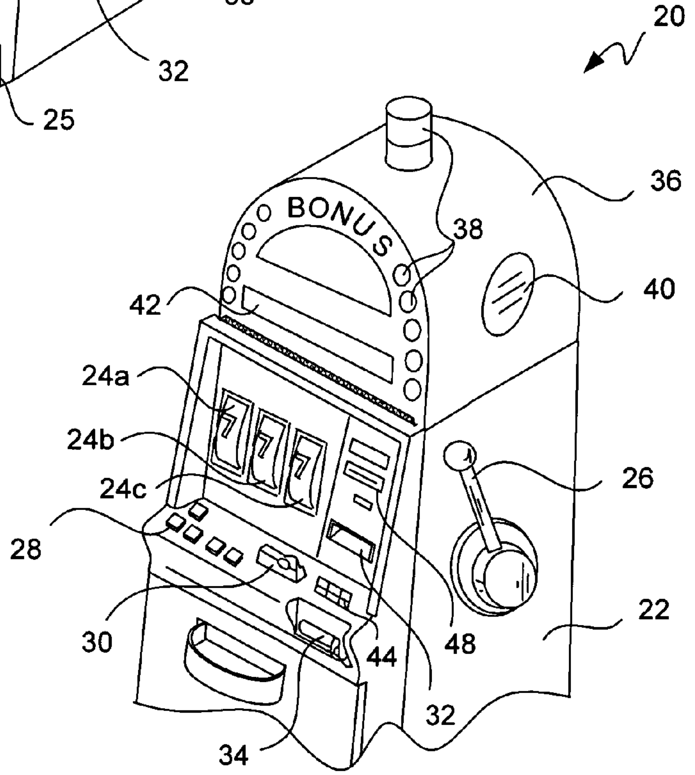
FIG. 1B illustrates in perspective view an alternative gaming machine similarly adapted to present and award a bonus according to one embodiment of the present invention.

FIG. 1B illustrates in perspective view an alternative exemplary gaming machine that is similarly adapted to accept a wager, play a game, award a winning, and present and award a bonus. In general, alternative gaming machine 20 includes a main cabinet or housing 22 that supports and/or houses the various components of the gaming machine. Although gaming machine 20 may have a shape, size or overall appearance that is significantly varied with respect to gaming machine 10, all of the bonus systems and methods disclosed herein can be utilized with either such gaming machine. In fact, it is specifically contemplated that every inventive embodiment disclosed herein can be used in conjunction with all gaming machines of any shape or size, with appropriate adaptations or adjustments made as necessary. Accordingly, alternative exemplary gaming machine 20 is presented merely to illustrate the variety in types of gaming machines that can be used with the inventive bonusing systems and methods of the present invention, such that no limitations or restrictions on such gaming machines can be assumed or inferred thereby.

In the embodiment illustrated in FIG. 1B, gaming machine 20 is adapted to present a game of "slots," and hence includes three rotating reels 24*a,b,c*. A handle 26 or spin button 28 may be used to effectuate rotation of the reels 24*a,b,c*. In this well known game, a player may be declared a winner of the game and awarded an award if the result of the rotation of the reels 24*a,b,c* is a predetermined combination of symbols. It should be understood that the gaming machine 20 might also be adapted to present one or more of a wide variety of games. Depending upon the game presented, the configuration of the machine may vary. For example, in the event the gaming machine 20 is adapted to present the game of video poker, then the gaming machine 20 may include a video display, such as that shown for gaming machine 10. As in the case of gaming machine 10, gaming machine 20 is also preferably adapted to present a wager type game. In this arrangement, a player is required to place a bet or wager in order to participate in the game. In the event the outcome of the game is a winning outcome, then the player may be provided with an award such as coins or currency, or credits, which may be redeemed for prizes or money. In one arrangement, the award may be winnings in proportion to the amount wagered or bet by the player. In order to accept a wager, the gaming machine 20 may include a coin acceptor 30 for accepting coins. The gaming machine 20 may also include a bill acceptor or validator 32 for accepting paper currency. The gaming machine 20 may be provided with other means for accepting or verifying value, such as a credit card reader.

In one embodiment, alternative gaming machine 20 contains a top box 36 that includes a plurality of lights 38 for visual stimulation, at least one speaker 40 for generating audible information, and a bonus indicator 42 in the form of a video display. The lights 38 may be of a plurality of types and be arranged to display in various colors. The bonus indicator 42 may comprise a CRT type display, or an LCD/LED display or the like. As described in more detail below, the bonus indicator 42 may be arranged to display a wide variety of information, including player tracking information and information regarding bonuses. The player tracking device of gaming machine 20 also includes a card reader 34 for reading information associated with a player card. The player card may comprise a plastic card including a magnetic stripe. In that arrangement, the card reader may comprise a magnetic stripe reader. The player card may comprise a number of other devices, such as a smart card including a chip. The player tracking device of the gaming machine 20 also preferably includes a keyboard or keypad 44, which permits input from a player. The keypad 44 is preferably associated with the player tracking function, such as for inputting a player identification or personal identification number (PIN). The gaming machine player tracking device may have a variety of other configurations and include the other devices. For example, the player tracking device may be fully integrated into the gaming machine and not include a separate top box.

Figure 2:
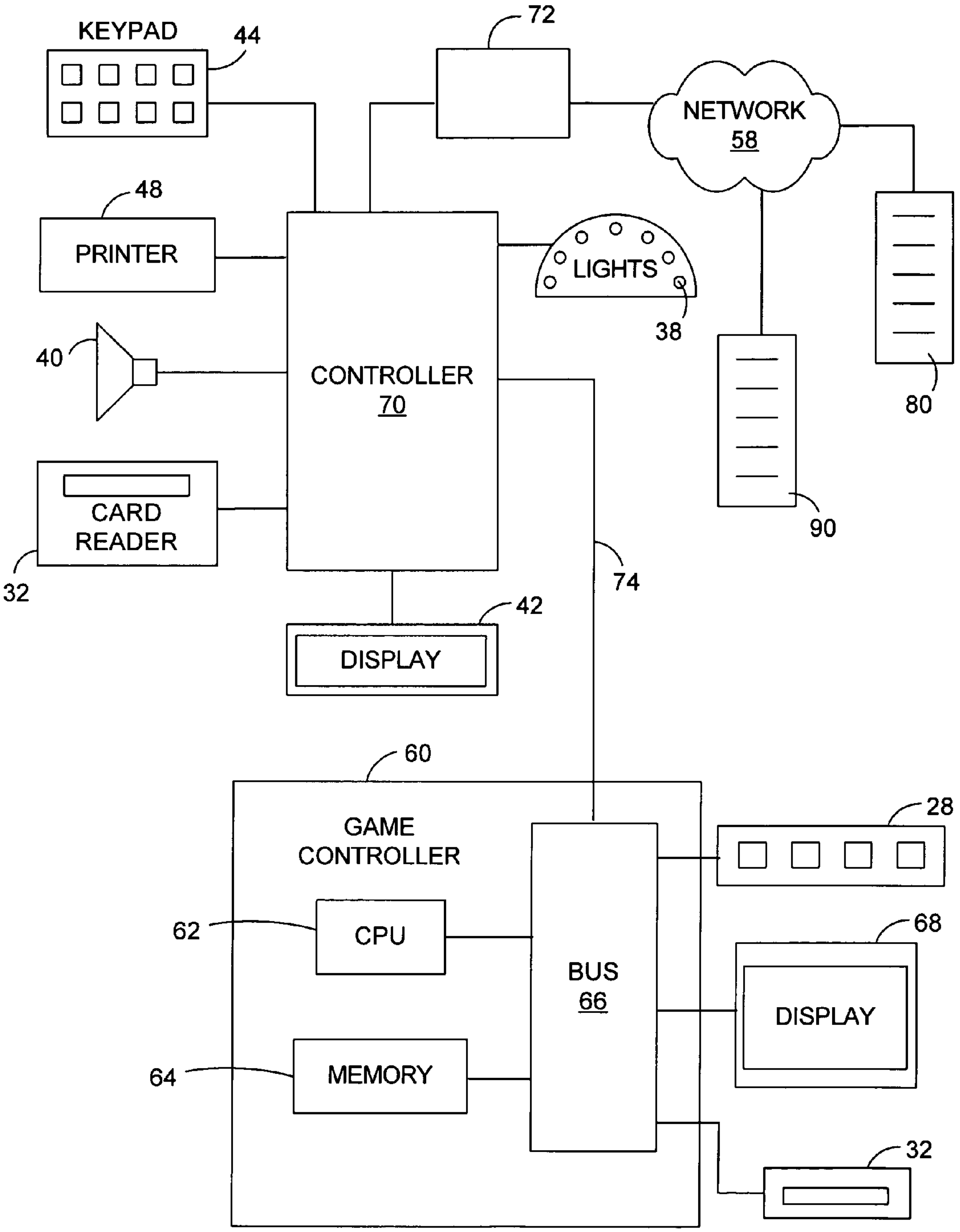
FIG. 2 illustrates a block diagram of an exemplary bonus system including a plurality of gaming devices of the types shown in FIGS. 1A and 1 B according to one embodiment of the present invention.

Referring now to FIG. 2, a block diagram of an exemplary bonus system including a plurality of gaming devices of the types shown in both FIGS. 1A and 1B is illustrated. As shown, a gaming machine includes a gaming machine controller 60 that is generally arranged to facilitate the presentation of a game to a player of the gaming machine. In one embodiment, the gaming machine controller 60 includes a processing device or CPU 62 and a memory 64 associated with a bus 66. The memory 64 is arranged to store information, such as game software/code for execution by the processing unit 62. The processing unit 62 outputs instructions/data through the bus 66 for controlling one or more peripheral devices of the gaming machine for presenting the game. As shown, one or more of the peripheral devices may include a display 68. In the case of a slot game, the display 68 may comprise one or more reels. In the case of video poker and other games, the display 68 may comprise a CRT, LCD or the like. Other peripherals may include the above-referenced keys or buttons for accepting user input, and a coin acceptor/bill validator. The gaming machine controller 60 may be located in an internal portion of the gaming machine. In general, the arrangement of a gaming controller and its method of operation in presenting a game is well known, and the foregoing arrangement and all other suitable arrangements are specifically contemplated for use with the present invention.

A player tracking device associated with the gaming machine preferably includes a controller or control device. In general, this control device is adapted to execute instructions/perform tasks, and transmit information or data from the gaming machine to a remote location via a player tracking system network 58. As part of the tasks, the control device is adapted to control one or more peripheral devices, such as the lights 38 and printer 48. In one embodiment, this control device comprises a slot management interface board (SMIB) 70, which may have a variety of forms and configurations. In one embodiment, the SMIB 70 comprises a circuit board having circuits configured to execute or implement a variety of instructions/tasks. In one embodiment, the SMIB 70 is arranged to control or interface with one or more peripheral devices. In a preferred embodiment, these devices can include a bonus indicator or display 42, a keypad 44, a card reader 34, lights 38, at least one speaker 40, and a printer 48. SMIB 70 and the peripheral devices may be arranged to communicate using a variety of protocols, such as USB, serial or parallel, although other suitable communication protocols may be used. In one embodiment, the SMIB 70 is housed in the top box 36 of the player tracking device associated with the gaming machine 20. The SMIB 70 may be located elsewhere, however.

As illustrated in FIG. 2, a communication interface 72 is provided between the SMIB 70 and the player tracking system network 58. The communication interface 72 may comprise a wide variety of devices, such as, for example, a modem or a PC type card including an antenna for implementing a wireless communication protocol such as Bluetooth®. The communication interface 72 may also comprise a PC type card facilitating a protocol over a wired network, such as Ethernet or Firewire®. Player tracking information is transmitted via the SMIB 70 to a player tracking host 80. In one embodiment, data is transmitted from the SMIB 70 to the network 58 via the communication interface 72. This data is routed to the player tracking host 80.

In one embodiment, the information that is transmitted, besides player identification information, comprises game play information regarding a player's game play activity. This information may include coins in (or other monetary amounts credited), coins paid out, and time of play. In one embodiment, a communication link 74 is provided between the master gaming controller 60 and the SMIB 70 for transmitting this game play information. Game play information from the master gaming controller 60 is transmitted to the SMIB 70 via this link 74. The SMIB 70 may be arranged to manipulate the transmitted information, such as by changing its form for transmission to the player tracking host 80. In a preferred embodiment, the communication link 74 operates by a proprietary protocol that permits only limited interaction between the SMIB 70 and gaming controller 60. This proprietary protocol is preferably different than the communication protocol by which the SMIB 70 transmits information to and receives information from the network 58, including the player tracking host 80. In this manner, attempts to tamper with the master gaming controller 60 via access through the network 58 and SMIB 70 can be prevented. This ensures better security of the master gaming controller 60.

In one or more embodiments, the SMIB 70 may be arranged to direct information to either or both of the player tracking host 80 and a bonus system host 90. For example, the SMIB 70 may send information regarding a "card in" or "card out" event associated with the card reader 32 of the gaming machine 20 to both the player tracking host 80 and bonus system host 90. The "card in" event may comprise a player inserting their player card into the card reader 32 of the gaming machine 20. The "card out" event may comprise a player removing their card from the card reader of the gaming machine 20. Other information may be transmitted instead of or in addition to the card in/card out event. In one embodiment, information may be transmitted from the player tracking host 80 to the bonus system host 90. For example, the player tracking host 80 may be arranged to transmit a signal to the bonus system host 90 that a player has activated their account and is playing a particular gaming machine. Information may also be transmitted from the bonus system host 90 to the player tracking host 80. For example, the bonus system host 90 may send information regarding a number of credits awarded to a particular player of a gaming machine 20.

Further aspects of various player tracking functions will now be described. In one embodiment, an account is created for each user of the player tracking system. In order to participate in the reward or tracking system, a player may be required to provide certain information, including identification information. This may be accomplished by filling out a request form providing the information. A casino or other gaming machine operator may then generate an account for that player. The player's account information may be stored at a data storage device of the player tracking host. The player is issued a player tracking card. This card includes identification information, such as a unique player identification code. When a player wishes to play the gaming machine, the player inserts his or her player tracking card into the card reader 34. The card reader 34 reads the player identification code. This code is transmitted to the player tracking host 80 via the SMIB 70 and the player tracking system network 58. Insertion of the card and transmission of the identification code may be used to identify the start of a game player session of that particular player.

In one embodiment, in response to receiving the identification code, the player tracking host 80 may send a prompt requesting that the player input a personal identification number (PIN) or other code. The prompt from the player tracking host 80 may cause the SMIB 70 to cause the display 42 to display a request to the player that the player input their PIN. A player may then input his or her PIN using the keypad 44. The PIN is transmitted to the player tracking host 80, where it is verified against a PIN stored in association with the player's identity. If the player's PIN is correct, then an indication of such may be provided, and an instruction that the player may begin game play may be provided. Game play activity data may thereafter be obtained and transmitted to the player tracking host 80. The game play activity data may be manipulated and stored. In one embodiment, the player tracking host 80 may be arranged to associate information with the player's account. This information may comprise awarded points that may be redeemed for prizes or awards, such as free game play. Of course, the player tracking system may have a wide variety of features other than or different than those described herein. For example, PIN information and features may not be used for some player tracking systems. Further, the player tracking system may be arranged in a wide variety of configurations and include other components that are also described herein.

Gaming Systems and Network Configurations

Figure 3:
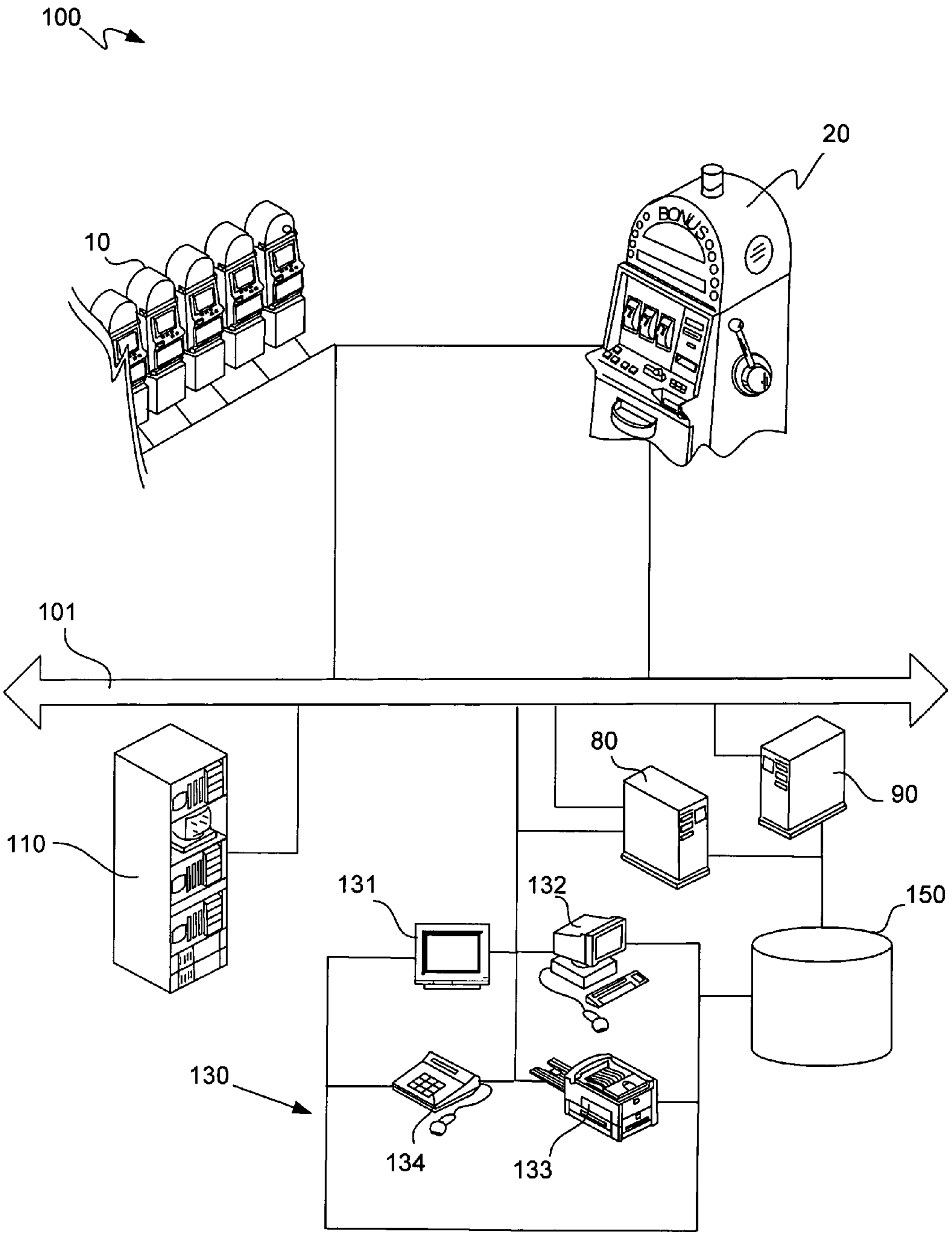
FIG. 3 illustrates a block diagram of an exemplary bonus system or network including one or more gaming machines of the types shown in FIGS. 1A and 1B according to one embodiment of the present invention.

Turning now to FIG. 3, a block diagram of an exemplary bonus system or network including one or more gaming machines of the types shown in FIGS. 1A and 1B is illustrated. In this embodiment, a provided system, and preferably a network or like structure, is adapted to connect a plurality of gaming machines together, with at least one of the included gaming machines being adapted to present and award a bonus. Accordingly, system 100 contains a plurality of gaming machines 10, 20 in one or more locations, with at least one of these gaming machines adapted for bonus use and connected to the system in some manner. In particular, the player tracking device or devices of one or more of gaming machines 10, 20 are preferably associated with one or more other devices through a wired or wireless communication network on system 100 including at least one communication link. Any suitable communication means can be use to connect the gaming machines to the network and one or more servers or hosts. For example, a common network bus 101 can connect some or all of these gaming machines with other network components, which can include, for example, a general-purpose server 110.

Such a general-purpose server 110 may be one that is already present within an establishment for one or more other purposes in lieu of or in addition to bonus system management and player tracking. Other functions for such a networked general-purpose server include, for example, accounting and payroll functions, Internet and e-mail capabilities, switchboard communications, reservations and other hotel and restaurant operations, and other assorted general establishment operations. In some instances, bonus system management and player tracking functions may also be associated with or performed by such a general-purpose server. For example, such a server may be linked to one or more gaming machines within an establishment, and in some cases form a network that includes all or substantially all of the gaming machines within that establishment. Communications can then be exchanged from each machine to bonus system and player tracking programs on the general-purpose server.

In a preferred embodiment, however, system 100 also has at least one special purpose player tracking and/or reward system host or server 80 and/or at least one additional special purpose bonus host or server 90, either or both of which are used for various functions relating to player tracking and determining, presenting and awarding bonuses on appropriate gaming machines in the system. Such additional player tracking and bonus hosts or servers are desirable for a variety of reasons, such as to lessen the burden on the general-purpose server or to isolate or wall off some or all player tracking and bonusing information from the general-purpose server and thereby limit the possible modes of access to such information. Alternatively, system 100 can be isolated from any other network within the establishment, such that a general purpose server 110 is entirely impractical, and such that one or more special purpose hosts or servers 80, 90 dedicated solely to player tracking and bonus system management matters are implemented.

In one or more embodiments, each of player tracking host 80 and bonus host 90 includes a processing device, such as those manufactured by companies such as Intel, Sun, and AMD. One or more of the various functions of the player tracking host 80 and bonus host 90 can be implemented by computer readable and executable program code. Further, each of player tracking host 80 and bonus host 90 may comprise a single computer server or a group of computers associated with one another on the network 100, as desired. Alternatively, both player tracking host 80 and bonus host 90 may reside on a single computer server. Appropriate hardware and/or software is provided for permitting the one or more computing devices of player tracking host 80 and bonus host 90 to send and receive information. For example, in one embodiment, data may be sent to and from the player tracking host 80 in accordance with any number of protocols, such as TCP/IP, Ethernet, IEEE-1394, Bluetooth® and others. Appropriate hardware and software for implementing these protocols is provided, and the communication protocol and the form of the network 100 are chosen in tandem. For example, the Bluetooth® protocol may be implemented with a wireless network including wireless data relay stations. An IEEE-1394 protocol may be implemented over a wired network, such as copper wire or fiber optic lines.

In one embodiment, the player tracking host 80 and bonus host 90 both include at least one data storage element for storing the player information. The data storage element may comprise a hard drive, RAM, tape drive, CD-ROM, DVD-RAM or other memory or data storage member or element. Both hosts 80, 90 may also be associated with a number of other devices, such as one or more displays, keyboards and other devices for displaying data, controlling operation thereof and the like. For example, player tracking host 80 and bonus host 90 may also include connections to a sub-network 130 of one or more network accessing devices, as well as a database or other suitable storage medium 150, as shown. Network devices may include, but are not limited to, one or more video monitors 131, one or more user terminals 132, one or more printers 133, and one or more other digital input devices 134, such as a card reader or other security identifier, as desired.

Database 150 is preferably adapted to store many or all files or data related to various tracked players and bonus games, such that these files or data are readily accessible. Database 150 is thus preferably directly accessible by one or more of the network devices on sub-network 130 connected to player tracking server 80 and bonus server 90, such that data specific to bonuses, player status or gaming machines on the database may be readily retrieved and reviewed at one or more of these network devices. Parameters for storing such files or data can vary widely, and are left up to the discretion of the system administrators. In addition, it is contemplated that one or more network devices on sub-network 130 may also be connected directly to common bus 101, as illustrated. Additional details of implementing player tracking and/or bonus award systems on a gaming machine network can be found in, for example in commonly owned U.S. Pat. Nos. 6,319,125 and 6,364,768, both by Acres, and U.S. Pat. No. 6,722,985 by Criss-Puszkiewicz, et al., each of which is incorporated herein in its entirety and for all purposes.

In one embodiment, the player tracking host 80 is adapted to implement a player tracking/reward or "comp" function. The player tracking host 80 may thus be adapted to aggregate game play data regarding various players playing on any of tracked gaming machines 10, 20. This data may include information such as the length of time of game play, amounts bet, amounts awarded, and a wide variety of other information. In general, the player tracking device of each tracked gaming machine 10, 20 is adapted to transmit the player tracking data over the appropriate communications link or links to the player tracking host 80. Based on player activities, a player may be awarded a "comp," as will readily be understood by those skilled in the art. Comps are generally awards, such as prizes, money, free game play, lodging or the like which are provided to the player apart from any awards which the player receives from direct game play. Such items are referred to as "comps" as they are "complimentary" and generally do not require specific obligation, such as an additional bet, in order to be received. The system is often referred to as a reward or loyalty system because a player is generally awarded an award resulting from an extended or frequent game play. In one arrangement, a player may acquire points based upon game criteria, such as amounts bet, won or lost. If a player accrues sufficient credits, the player is awarded an appropriate "comp" or reward.

In a preferred embodiment, the bonus system is associated with and/or shares certain aspects of the player tracking system. For example, the player tracking host 80 and bonus system host 90 may comprise the same device or devices arranged to implement both player tracking and bonus functions in accordance with the invention. In general, the bonus system host 90 is arranged to generate bonus information, including bonus award information to a player or prospective player of a gaming machine, and determine the eligibility of a player to participate in a bonus event and to determine the winner or winners of the bonus event. The bonus system host 90 is preferably arranged to generate bonus information and transmit it to a player tracking device associated with a bonus system gaming machine 10, 20 via a communication link of the player tracking network 100. Information may also be transmitted from the player tracking device associated with a gaming machine 10, 20 to the bonus system host 90, as desired.

Player Information Database

Figure 4:
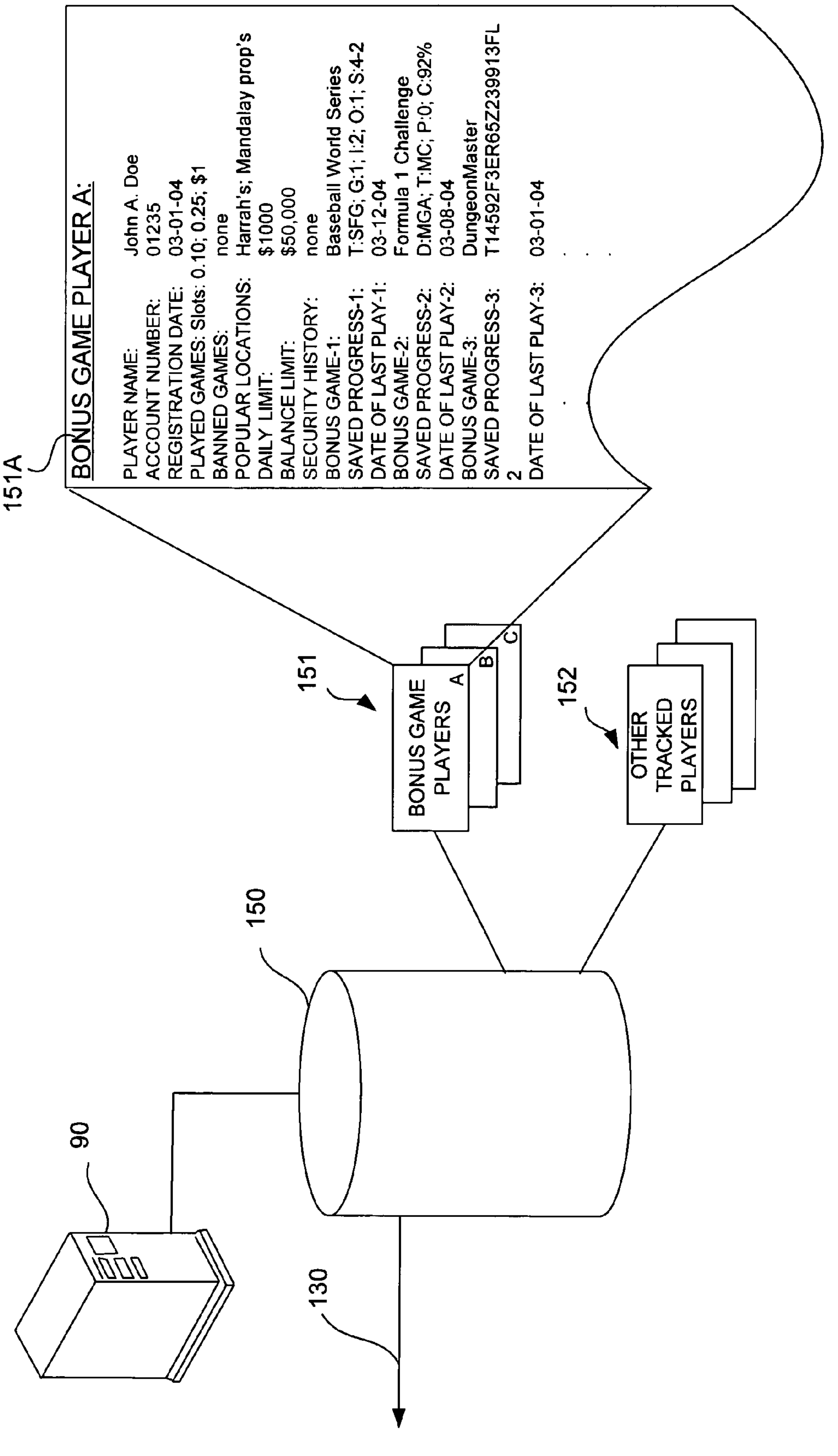
FIG. 4 illustrates a block diagram of an exemplary database containing associated data identifiers of various bonus game players and other tracked players according to one embodiment of the present invention.

Referring to FIG. 4, a block diagram of an exemplary database containing associated data identifiers of various bonus game players and other tracked players according to one embodiment of the present invention is illustrated. As similarly illustrated in FIG. 3, database 150 is accessible to one or more servers, preferably at least bonus system server 90 and/or player tracking server 80 (not shown), and has a connection to a network 130 of one or more peripheral devices. Database 150 preferably contains information or data files related to a plurality of bonus game players, as well as information or data files related to a plurality of other tracked game players within the system. In addition, database 150 can be constructed such that it also contains information or data files with respect to other individuals or other pertinent items of tracked data, as desired.

Contained within database 150 are numerous files with respect to many different past and present players within the bonus system and/or player tracking system, and preferably all such users are contained within database 150 or a collection of associated databases. Although many different arrangements are possible, such files can be classified according to bonus game player files 151 and other tracked player files 152. Contained within each such file is a player profile having numerous informational items, restriction requirements, if any, access level or levels, marketing information, if applicable, and preferably at least one bonus game saved progress file containing information for that player regarding the progress of a bonus game or series that the player has played. As shown for player file 151A, such information can include items such as, for example, a player name and account number, a registration date, the types or denominations of games played by that player, restriction and security information with respect to that player, daily and overall spending or balance limits, and one or more saved progress files or data strings for persistent bonus games or series, among others. Such information can not only be stored within a player file within the database, but can also be retrieved, utilized and/or forwarded by the bonus system server 90 and/or a processor, SMIB, or other controller present at a gaming machine or associated player tracking device in use by a given player.

In other embodiments, actual data for individual players may not be taken and recorded for some or all players. Such might be the case in the event of a persistent bonus system that is not incorporated or associated with a player tracking system, and that can save bonus game progress by issuing printed tickets or requiring the input of a PIN or other access code to continue a particular saved bonus game. Under such a system, files within the database 150 may be sorted by printed ticket numbers or other anonymous account identifiers. Such a system may provide for a combination of known tracked players and anonymous players within the same persistent bonus game scheme. Additional features and items present and storable at database 150 are discussed in greater detail below.

General Bonuses and Bonus Funding

Figure 5:
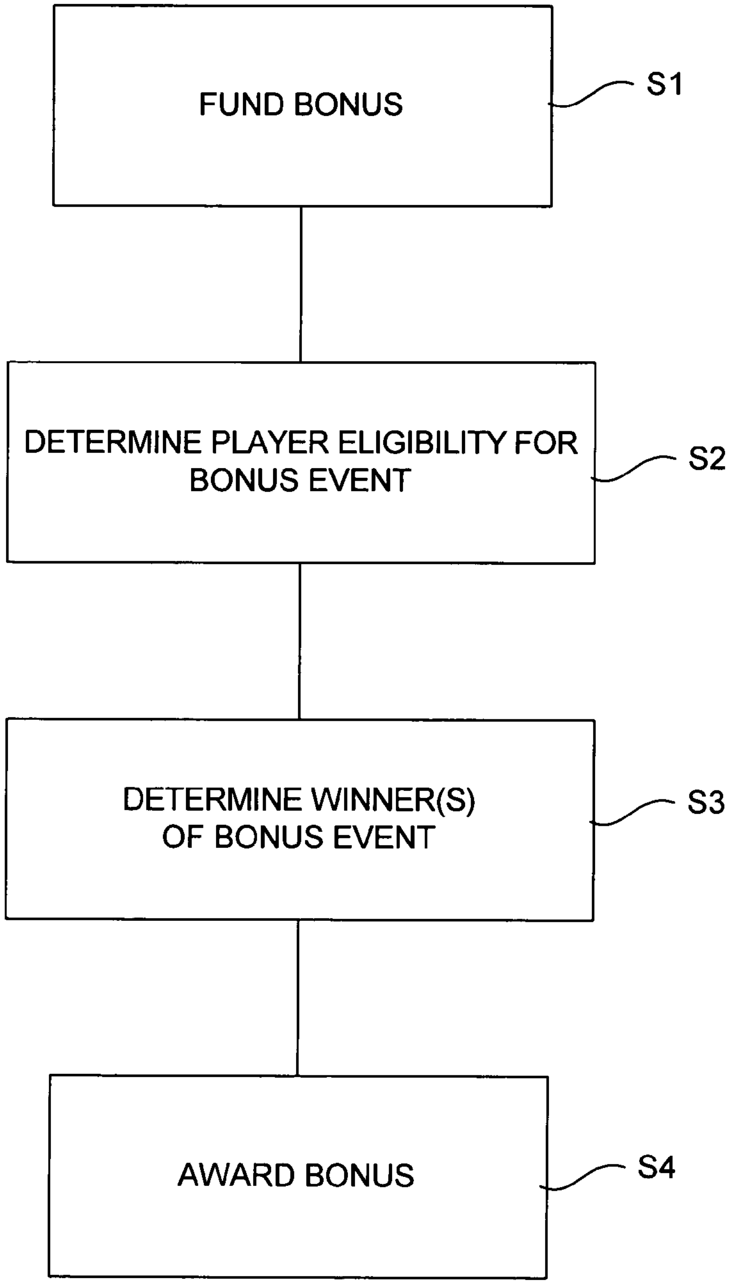
FIG. 5 illustrates a flowchart of one method of providing a bonus for a gaming machine according to one embodiment of the present invention.

Moving on to more specific examples of the types of bonus systems and methods available under the present invention, FIG. 5 illustrates a flowchart of one method of providing a bonus for a gaming machine. As shown, a first step S1 comprises funding the bonus or jackpot. By funding, it is meant providing the coins, monies, prizes or other awards that are to be used as the bonus. Such funding can be a function of bets, wagers or net income at the gaming machine, as is generally known in the art. In some cases, it is preferable to notify players of such a funding arrangement prior to any play on the gaming machine or under a given bonus game, such as through a disclaimer or other notice in an on screen displayed presentation or other label on the gaming machine. Alternatively, such funding can be provided independent of particular bets or wagers that must be placed to play the game. In other words, the bonus can be funded without a side bet or without a predetermined portion of the bet being set aside to fund the bonus. In one embodiment, the bonus is funded through a general fund or source of the operator of the gaming device. For example, a portion of the hold on a gaming machine or group of gaming machines may be set aside for a funding a bonus. As will be appreciated, the hold on a particular game or games may change over time, such as from month to month. Thus, the amount of the bonus may change from month to month.

In a second step S2, it is determined if a player is entitled to participate in the bonus or bonus event. In other words, it is determined if a player is eligible to participate in the event. In one embodiment, this step comprises determining if a player meets one or more criteria for participating in the bonus event. In one or more embodiments, one or more of a variety of criteria may be utilized. These criteria may comprise, but are not limited to, the following: a player's play of a specific gaming device or type of gaming device; the wagering of a particular amount per game or over time; an amount won or lost over a period of time; the player achieving a particular point total in their reward account; the number of visits by the player to the gaming establishment; the time period during which the player is playing the game; or the purchase of goods or services unrelated to game play, such goods from a shop, food or drink from a restaurant, show tickets, lodging or the like. In one embodiment, the criterion is unrelated to the specific outcome of a game played on a gaming device.

In a step S3, it is determined if a particular player has won a bonus. Preferably, only those players who were determined to be eligible to participate in the bonus event can be winners of a bonus. A variety of criteria may be used to determine the winner or winners of a bonus. Such criteria may comprise, but are not limited to the following: a player playing a particular gaming machine at a particular time; a player achieving a particular point level; the first player to play a predetermined number of different gaming machines in a period of time; a player achieving a specific loss amount; a player achieving a loss amount in a given period of time; a player playing a particular number of games or a highest number of games in a period of time; or a player achieving the highest winnings during a period of time.

In step S4, the bonus is awarded to the player. The bonus may be awarded in a variety of ways. For example, the player may be awarded credits that can be displayed on the display of the gaming machine or player tracking device to the player. The award may be issued in the form of a ticket or receipt. The award may also be issued in the form of coins dispensed at the gaming machine. In one or more embodiments, a bonus may only be awarded during a certain period of time. For example, a bonus "period" may set that has a start time, and in one embodiment, an end time. No person may be awarded the bonus before the start time. In one embodiment, a player may be awarded the bonus after the start time, and the time when the bonus is awarded may be other than the end time. In another embodiment, the bonus may not be awarded until the end time is reached.

In this arrangement of a method of awarding a bonus, a casino or other game operator may advertise the bonus event, including the time when the bonus event is to be held and the criteria upon which a bonus will be awarded. In the prior art, a bonus may be awarded only when a specific outcome is achieved on a gaming machine. The timing of such an outcome is indeterminate. In the present invention, the game operator may indicate that a bonus will be awarded at the end of a specific time period. For example, a game operator may indicate that the first player to play fifty (50) different gaming machines will be declared the winner of the bonus. Alternatively, the game operator may indicate that the player with the highest loss at the end of a five (5) hour bonus play period is entitled to the bonus. In such events, the player or players can be certain that a bonus will be awarded to at least one player, and that such will occur at a time certain or within a definite time period.

A particular embodiment of a method of awarding a bonus in accordance with the invention utilizing the bonus system 100 will now be described in detail. In one embodiment, the bonus system host 90 is configured to generate a bonus for a player of a gaming machine 10, 20. In one embodiment, eligibility of a player may be determined by a player identifying himself or herself via the player tracking system. Such identification may comprise the player inserting his or her player tracking card into the card reader of the player tracking device associated with an appropriate gaming machine 10, 20. In one embodiment, when the player's card is inserted, the SMIB 70 is arranged to send a signal of such to the bonus system host 90. The particular player tracking device or the gaming machine with which the player tracking device is associated may be identified to the bonus system host 90, such as by a unique code. If the player is determined to be eligible, the bonus system host 90 may then transmit bonus information to that particular gaming machine. As is known in the art of communications, the bonus system host 90 may send packetized information including a destination header that dictates that the information only be directed to or accepted by the intended destination, such as a particular player tracking device associated with a particular gaming machine. The information transmitted may indicate to a player that they are eligible to participate in a bonus event, and the criteria upon which a winner of the event will be declared.

In another embodiment, a player may be determined to be eligible by a wide variety of other criteria. For example, eligibility may be determined by a player providing credits to the machine, such as coins or bills input to the machine or by actual game play. In such event, the master gaming controller 60 may be arranged to send a signal regarding the initiation of game play to the SMIB 70, which in turn sends a corresponding signal to the bonus system host 90. Of course, one or more players who are eligible may cease to be eligible before the bonus is won or awarded. For example, a particular player may cease game play before the end of a bonus period and become ineligible to participate in a bonus, event if prior to the player's cessation of play the player met the criteria otherwise necessary for winning the bonus (such as a total amount lost).

Next, the bonus system host 90 determines if any of the one or more players who are determined to be eligible are the winners of the bonus event. As indicated above, a variety of specific circumstances or events may be used as criteria for awarding a bonus, including the timing of the bonus and the value of the bonus. In one embodiment, a bonus may be based upon game play information. For example, in the event a player loses a predetermined amount of money, such as evidenced by total coins in compared to total coins out while playing the machine, then the bonus host 90 may be arranged to generate a bonus award for the player. In one embodiment, the bonus system host 90 may poll the player tracking host 80 to determine the existence of one or more players who satisfy the criteria for a bonus. For example, at predetermined intervals the bonus system host 90 may poll the player tracking host 80 for the identity of players (as associated with particular player tracking devices of particular gaming machines) who have suffered losses of a certain amount. In another embodiment, the player tracking host 80 may be configured to determine such and directly provide the results of such to the bonus system host 90. The bonus system host 90 may be arranged to provide a bonus based on other criteria, such as an indication that a player has placed a certain number of bets, bets in of a certain value, or the like.

In one embodiment, a bonus may be awarded to one or more eligible players on a random basis. For example, the bonus system host 90 may include a random number generator, where the selected numbers are associated with a bonus or no bonus, and in the case of a bonus, a bonus amount. In one embodiment, the bonus system host 90 is arranged to randomly generate bonuses and provide them to one or more eligible players. As described above, an active player may be identified by their use of a player tracking card or by other events associated with the gaming machine. The timing and size of a bonus is determined by the outcome of the selection of the random numbers. In one embodiment, the criteria for a bonus may include a player's performance of certain acts. For example, a bonus may be awarded to each player who plays a certain number of games or a certain number of different gaming devices during a predetermined period of time. The bonus system host may poll player information regarding player play to determine if any eligible players have satisfied the criteria for a bonus.

In one embodiment, a bonus event or opportunity for a bonus may be indicated at a machine or group of machines in order to entice greater play at that machine or group of machines. For example, the bonus host 90 may send bonus information to a particular machine or group of machines to entice play. In one embodiment, bonuses may be awarded by the bonus system host 90 only to one or more eligible players of a selected machine or to players of a group of machines. The bonus system host 90 may cause the display of information on the display 42 that a player of the machine may be awarded a bonus while playing that particular machine. Preferably, when a bonus is awarded, a notification event occurs which includes a visible and/or audible indication of the award. In one embodiment, the bonus host 90 transmits a signal or data over the network 58 to the SMIB 70 causing the SMIB 70 to display information regarding the bonus on the display 42, to produce audio information via the speaker 40, and illuminate the lights 38. In one embodiment, the lights 38 may be caused to illuminate or flash, and a variety of sounds may be produced by the speaker 40 creating a festive atmosphere.

In one embodiment, the bonus may comprise a monetary award, an award representative of a monetary award, a non-monetary prize or an award representative of a non-monetary prize. In a preferred embodiment, the bonus comprises credits associated with the player's account, which credits may be used for game play or as the basis for another award. For example, in one embodiment, a player utilizing the player tracking system may be awarded points based on their play of a gaming machine. The points may be based upon the total coins in or out, the difference between coins in and out, theoretical win or loss, or other criteria. In any event, a player may be permitted to redeem the points associated with their account for an award. In one embodiment, when a player is awarded a bonus, the bonus may comprise points associated with the player's account.

In one embodiment, a ticket may be dispensed that is representative of money or another type of award. The ticket may be printed and issued utilizing the printer 48 associated with the SMIB 70. The ticket may be redeemable for a prize or monetary award, such as consumer goods, lodging, meals, tokens or the like. The ticket may also comprise a coupon that entitles the player to a reduced price for goods or services. In one embodiment, the ticket may be readable by another device and used in place of money. Such a ticket and a method of using a ticket in lieu of cash is disclosed in commonly assigned U.S. Pat. No. 6,394,907 to Rowe, which reference is incorporated herein in its entirety and for all purposes. A ticket may also be printed as a receipt evidencing to a player that an award, such as credits, has been printed.

The bonus systems and methods of the invention as described herein may alternatively be arranged in fashions other than as described, and may operate in other manners. For example, in one embodiment the bonus system may be arranged to award a bonus to a player of a gaming machine regardless of whether the player of that machine is currently identified via the player tracking system. This arrangement has the benefit that while the bonus system utilizes the player tracking system for providing the bonus, the player who is awarded the bonus need not have a player tracking account or have activated their account during the session of play. In accordance with the invention, the manner by which the bonus systems and methods are implemented, including the manner and form of communication, may vary. For example, the form of the bonus event information generated and/or transmitted by the bonus system host 90 may vary. Depending on the system, the information maybe in the form of an analog or digital signal. In one embodiment, a particular signal from the bonus system host 90 may trigger the execution of certain events by the SMIB 70. For example, the SMIB 70 may be arranged to display certain bonus information in response to one signal, and other bonus information in response to a different signal received from the bonus system host 90. In another embodiment, the bonus event information generated by the bonus system host 90 may comprise data used by the SMIB 70, such as particular video data that causes an associated video display to display certain information, such as details in the English language regarding how to be awarded a bonus.

It will be appreciated that the bonus system host 90 may be located remote from some or all bonus system gaming machines 10, 20. Further, one or more gaming machines 10, 20 that are located remotely from one another may be associated with the same bonus system host 90. The one or more bonus system gaming machines 10, 20 may be associated with one location, different gaming properties or operators, or a variety of properties or locations operated by a single party. In such an embodiment, the one or more communication links forming the network 100 may comprise phone lines or the link connecting the properties. For example, the network 100 may form a WAN or other similar networked body.

As indicated above, one or more aspects of the invention may be implemented as hardware or software. For example, the bonus system host 90 may be configured to execute computer readable program code for implementing one or more steps of the method of the invention. Such steps may comprise determining the eligibility of players and whether criteria for winning a bonus have been satisfied. One or more methods of the invention may be implemented via a system other than those described herein. For example, the bonus systems and methods illustrated herein may be implemented in a wide variety of manners. A bonus may be awarded by mailing a winning player a ticket or voucher or other indication of winning instead of directly through the bonus system as described.

Other variations of the methods disclosed herein are also contemplated. For example, in accordance with a method of the invention, the bonus may be changed during a bonus period or over time. Further, this change may be independent of specific outcomes of the games played on the gaming devices or wagers placed by players. The method of the invention may be implemented in an environment including other than gaming machines or devices per se. For example, the method may be implemented with respect to table games such as Blackjack and Poker. In one embodiment, a player tracking device may be associated with the game, such as the game table for implementing the method.

The bonus system and method of providing a bonus in accordance with the present invention has numerous advantages. As one aspect of the invention, there is provided a method of awarding a bonus that is independent of the specific outcome of a game played on a gaming machine. In this arrangement, a player no longer needs to receive a specific outcome while playing the gaming machine in order to receive a bonus or be entitled to play for a bonus (such as in a bonus event or round). This arrangement is advantageous because a player may have an increased desire to continue playing a game knowing that they are eligible for a bonus, but where the bonus is not "out of reach" by virtue of only being achievable by obtaining a low probability outcome while playing the game.

A casino can reward players based upon a wide variety of factors that may be made known to the player. This arrangement is particularly desirable to a player, since the player may take specific action in an attempt to win the bonus. For example, the criteria for the bonus may be for the player to attempt to play a certain number of games in a predetermined period of time. A player is enticed into playing because the player's ability to qualify for the bonus is at least partially within the control of the player. In accordance with one aspect of the invention, there is provided a bonus system that might be implemented via an existing player tracking system or other system associated with a gaming machine. In many instances, the master gaming controller of a gaming machine is not associated with a network or system directly. Instead, the master gaming controller is provided with all of the necessary hardware and software for presenting one or more games. The ability to provide a bonus or award via an existing system eliminates the need to reconfigure the master gaming controller 60 to do so, including the need to associate the master gaming controller 60 with a communication link. In addition, the implementation of the bonus system via another system reduces the amount of time and expense of implementing the bonus system per se.

In one or more embodiments, the bonus system may be associated with other systems or networks providing communication to the gaming machine. For example, an existing gaming machine may be fitted for credit card use. A credit card reader, controller and communication interface may be associated with the gaming machine, and a communication path established from the interface to a remote location, such as via an installed cable. In accordance with the present invention, the bonus system maybe implemented on this credit card network. Preferably, additional peripheral devices are associated with the credit card controller, such as lights, a display and the like. In another arrangement, a separate bonus system controller maybe provided in communication with the bonus system host via the communication path/link of the credit card system.

One unique and advantageous aspect of the invention disclosed herein is that the bonus system can be unassociated directly with the gaming controller or the play of the game. A bonus may thus not be directly dependent upon the outcome of the game played at the gaming machine or upon other aspects of play of the game presented by the gaming machine. Because of the disassociation of the bonus system from the game or games presented at the gaming machine, a much larger variety of bonuses and criteria for bonuses may be provided. Another advantage of the bonus systems and methods disclosed herein is that they may be used to generate play at one or more particular gaming machines. For example, a casino may identify that a particular type of machine or a group of machines in a particular area are experiencing a low play volume. In order to entice greater play of those machines, the casino may arrange for bonuses to be awarded at those machines using the bonus system.

Yet another advantage of the bonus system is that it may be used to increase the use of a player tracking system. From the perspective of a gaming operator, the advantages of a player tracking system are well known. Player tracking systems provide gaming operators with information that is useful in marketing and in operation. In one embodiment, a player may not be awarded a bonus unless that player is using the player tracking system, either by having an established account or by actually having their account activated while playing a gaming machine. As noted above, in one embodiment, a player may be awarded a bonus by being the first player to insert their player card into the card reader of the player tracking device associated with a gaming machine. In another embodiment, a bonus may only be awarded to a player of a machine identified as actively playing a game via their player tracking card activation. In such arrangements, a player is enticed to use the player tracking system.

Persistent and Themed Bonuses

Figure 6:
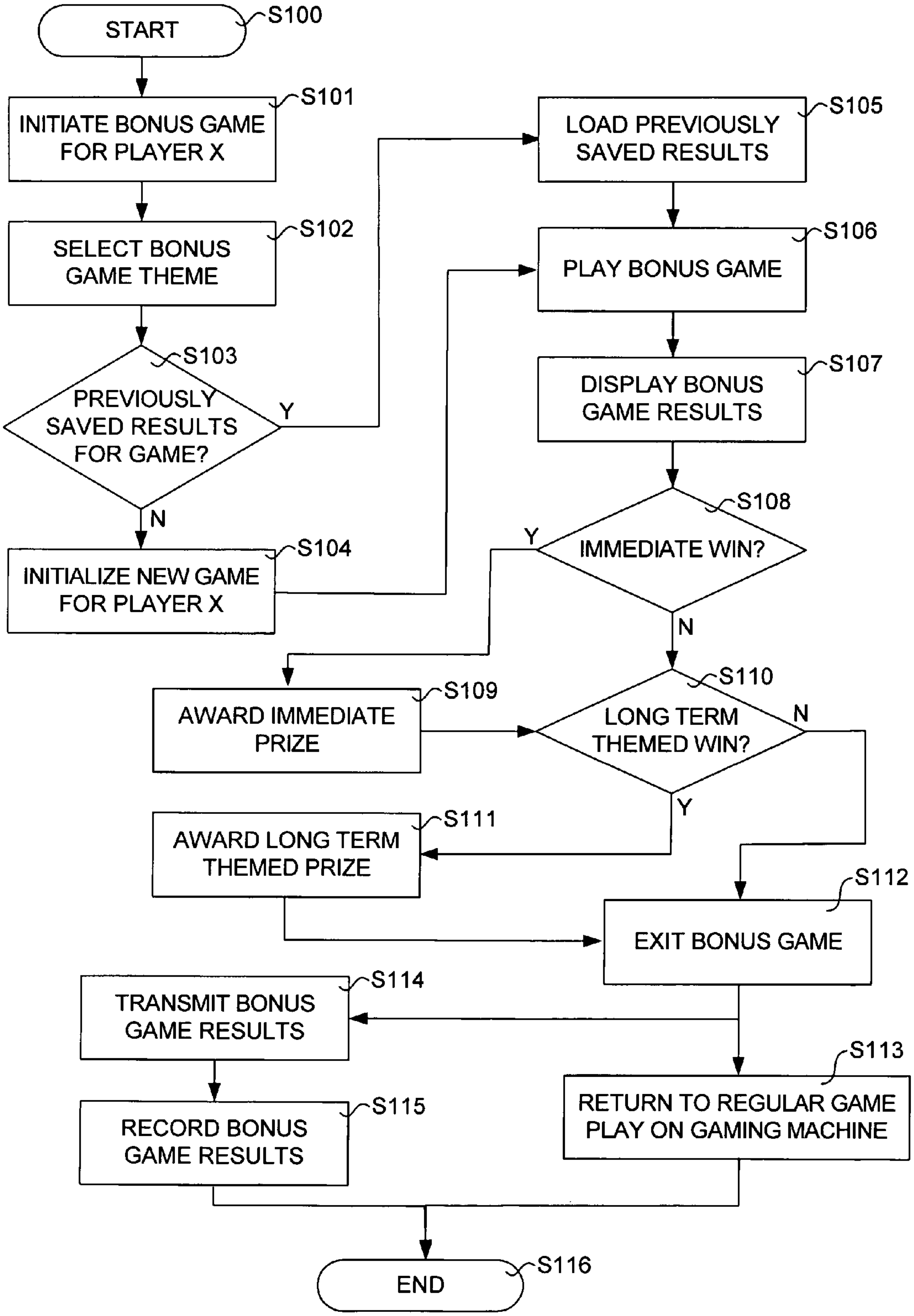
FIG. 6 illustrates a flowchart of one method of providing a persistent bonus for a gaming machine according to one embodiment of the present invention.

Continuing on with still other types of bonus systems and methods available under the present invention, FIG. 6 illustrates a flowchart of one method of providing a persistent bonus for a gaming machine system according to one embodiment of the present invention. Such a persistent bonus is one that carries over from one game play to another, or one gaming session to another, such that a player can play the same bonus game at different times, dates and/or locations, as desired. It is thus preferable that an ongoing persistent bonus game for any given player be personal to that player, and that the individual progress or status of that player be saved or recorded, such that the given player can access his or her bonus game and resume its progress at some later time and/or location. It is specifically contemplated that the bonus system as disclosed herein can continue on during a single playing session at a single gaming machine, or can stretch across multiple casinos and separately owned properties, such that a player can continue his or her own personal persistent bonus game at various casinos, and even cities or states.

As noted previously, such a persistent bonus system preferably operates in association with a player tracking system, which may be an already existing player tracking system with a previously implemented player tracking host. Under such an arrangement, it would be relatively simple to add bonus system host and tracking capabilities, such that a persistent bonus system could be implemented in "piggy-back" fashion atop an existing player tracking system. Alternatively, a separate player tracking system is not needed, and the bonus system, bonus host, and various bonus processors can be implemented independently. In such cases, definitive player identification or verification systems and methods may be used as desired. In addition, it is also possible to permit players to play under any kind of persistent bonus system anonymously. Such play might be preferable for some players who do not wish to be part of any commercial player tracking system, but would still like to participate in a persistent bonus game scheme or system. In such cases, saved play from session to session and machine to machine could be still be had via a centralized bonus host and database, albeit with differing ways of tracking player status and progress in an anonymous fashion. Such a fashion might involve, for example, the use of a unique code or identifier for a player, such as a PIN entered on a keypad. Alternatively, a printed ticket could be issued at the end of a gaming session; with the player being able to insert that same ticket into a gaming machine at a later time or location to prompt the loading of his or her saved bonus game and progress for future play.

According to the provided method, after an initial start step S100, a first process step S101 comprises initiating a bonus game for a given player at the gaming machine, hereinafter noted as "Player X." Such a bonus game can be initiated in any of a wide variety of ways, many of which are discussed in greater detail above. For example, a bonus game initiation can be had when Player X reaches a threshold amount of time spent or money wagered during regular game play, in response to any of a number of promotions by the gaming machine owner or operator, or via any other suitable approach, as desired. Alternatively, a bonus game can be initiated simply by starting play on or even checking in at the gaming machine, such that the bonus game is started and some incremental progress in the bonus game can be had with a check in at and/or each regular play of the gaming machine.

At the next process step S102, a persistent bonus game and/or bonus game theme may be selected. In some instances, only one persistent bonus game will be available, in which case step S102 is obviated. In the event that multiple persistent bonus games are available, however, then a particular bonus game can be selected. In one embodiment, the persistent bonus game is selected by the player after the player is presented with several choices or a menu of various persistent bonus games. In another embodiment, the casino or gaming machine operator selects which bonus game is to be played at a given gaming machine, date and/or time. In a preferred embodiment, one or more of the persistent bonus games have a specific theme, such as, for example, a baseball "World Series" or "Formula 1" racing series theme. Other examples and implementations of themed bonus games are presented in greater detail below. It will also be appreciated that step S102 can occur before step S101, such that a bonus game or bonus game theme can be selected and locked in even before the bonus game for Player X is initiated.

Once a bonus game and/or bonus game theme is selected and a bonus game is initiated, the gaming machine or bonus system can inquire at a decision step S103 as to whether Player X has any previously saved results for that particular bonus game or bonus game theme. Accordingly, it is preferable that Player X be already checked in or registered at the gaming machine, such as by inserting his or her player tracking card at a player tracking device at the gaming machine, by inserting a ticket bearing the results of a previously played bonus game, or by punching in a PIN on a keypad, among others. In the event that Player X has no previously saved results for the selected persistent bonus game then a new persistent bonus game for that particular game or theme is initialized for Player X at a process step S104. Such a "No" result and procession to step S104 is also likely in the event that no player tracking card has been inserted and no other check in at the gaming machine has been performed by Player X. In the event that Player X does have previously saved results for the selected persistent bonus game, then such a "Yes" result continues the method to a process step S105, where the previously saved results for Player X are loaded into the bonus game system processor or system as a starting point for immediate bonus game play, as will be appreciated by those skilled in the art.

Regardless of whether a new bonus game is initialized at step S104 or previously saved results are loaded at step S105, the method then continues to a process step S106, where the selected persistent bonus game is actually played. Such play of the bonus game can involve one or more graphical animations, spinning or rotating wheels or objects, audible beeps or music, or any other graphical, physical or audible presentations, as desired. The results of such play can also be random, based on some kind of input from Player X, or both. Input from Player X may be based on the skill or general knowledge of Player X, such as through a video game or trivia type quiz, or may simply be a player selection of one or more items that ultimately results in a random determination of the result and progress of the persistent bonus game. Once the play of the bonus game is finished, the bonus game results are then displayed at a subsequent process step S107. At such a display, it may be readily apparent whether the player has won or will win a bonus game award or prize.

At a next decision step S108, the gaming machine or bonus system host or processor determines whether an "immediate win" has been had as a result of the immediately preceding play of the persistent bonus game. Such an immediate win is one that is typically specific to the immediately preceding bonus game play, having little or no relation to the long term ongoing persistent bonus game. For example, in the event that the persistent bonus game has a "World Series" theme, an immediate win could be an award or prize that is given for any Home Run hit or Double Play turned by Player X during the immediately preceding bonus game play, regardless of the running score of the game or series. In addition, a random immediate "Instant Win" having no bearing on the overall theme of the bonus game may also be awarded or achieved during the actual play of the selected persistent bonus game.

In the event that any such "immediate win" is had during the instance of play of the selected bonus game, then the process continues to a process step S109, where a corresponding immediate award or prize is awarded. As in the foregoing examples above, such an award or prize can be in the form of, for example, coins, cash, gaming machine credits, player reward credits, comps, merchandise, goods, services, and other appropriate winnings in various degrees or levels, as desired. Such a win can be awarded to the player in coins from the machine, in cash or check form from a gaming machine attendant or other gaming operator personnel, in ticket or voucher form, as an actual physical prize, such as a car, or via other means, as deemed proper. In a preferred embodiment, a number of different immediate win prizes or awards are available, with a hierarchy or stepped levels in the types and size of prizes, depending upon the type or level of the immediate or instant win.

Regardless of whether an immediate prize is awarded at step S109 or no immediate win is determined at decision step S108, the method then continues to another decision step S110, where the gaming machine or bonus system host or processor then determines whether a long term themed win has been had as a result of the immediately preceding play of the persistent bonus game. Such a long term themed win is one that is typically specific to the long term play of the selected persistent bonus game, where a long term goal or milestone has been actually been achieved during the immediately preceding play of the bonus game. For example, again using a "World Series" theme as the theme for the persistent bonus game, a long term themed win could be an award or prize that is given for the win of an actual full baseball game or series by Player X during the immediately preceding bonus game play.

In the event that any such "long term themed win" is achieved during the preceding instance of play of the selected bonus game, then the process continues to a process step S111, where a corresponding long term award or prize is awarded. Again, such an award or prize can take many different forms and be awarded in a variety of ways, such as those listed above. In a preferred embodiment similar to that described above for an immediate win, a number of different long term themed win prizes or awards are available, with a hierarchy or stepped levels in the types and size of prizes, depending upon the type or level of the win. Also, it is preferable that the hierarchy or stepped levels of long term win prizes be somewhat better, higher or more preferable than the hierarchy or levels of immediate or instant win prizes, so as to promote and encourage long term play in association with the persistent bonus game. However, such differentiation or positive preference toward better long term prizes or awards is not absolutely necessary.

Regardless of whether a long term themed prize is awarded at step S111 or no such long term win is determined at decision step S110, the method then continues to a following process step S112, where the gaming machine or bonus system host or processor then exits the bonus game. At this stage, several things or steps may then take place, and in no particular order. Such additional steps can include the process step S113 of returning to regular game play on the gaming machine, the process step S114 of transmitting the new persistent bonus game results for Player X to the bonus system host or other appropriate bonus system controller or monitoring device, and the process step S115 of recording the immediately preceding persistent bonus game results for Player X at an appropriate storage device or database, such as database 150. The order and actual performance of each of process steps S112 through S115 may vary depending upon certain circumstances, but once all such steps are performed that are to be performed in a given instance, the process terminates at an end step SI 16. Depending upon further regular game play or other bonus game initiation conditions, the process may then begin again at start step S100.

As illustrated in FIG. 6, the transmit and record steps S114 and S115 happen simultaneously with the return step S113. As will be readily appreciated, however, Player X may not wish to return to regular game play, in which case step S113 might be obviated. Conversely, if Player X wishes to continue regular game play on the same gaming machine under the same bonus game theme, then the current results of the bonus game could be retained locally and not immediately transmitted and recorded at a database such as database 150. Accordingly, such present results could be stored and used locally at the gaming machine for potential improvements or progression as Player X continues play under the same persistent bonus game on the same gaming machine, with the final transmit and record steps S114 and S115 not taking place until the discrete gaming session under the selected bonus game has ended. In other embodiments, these transmit and record steps may be repeated or streamed continuously to the bonus system host and/or central database, such that these steps may even occur prior to the exit step S112. In any event, it is preferred that at least one final update of persistent bonus game results for Player X be transmitted to and recorded at the bonus system host and/or central database once Player X is finished with a gaming session at the gaming machine, such that these updated persistent bonus game results can be accessed and used at a later gaming session.

To this end, it is conceivable that Player X does not necessarily need to register or check in prior to playing under a given persistent bonus game; but rather can do so any time before or at the end of the gaming session, and thereby still be able to have his or her persistent bonus game progress saved. While such a practice may be impractical or impossible in the case of some ongoing themed persistent bonus games, other types of games that are geared more towards the general accumulation of points or credits may allow for such use. In addition, it may be necessary for a new player to register or check in at some point if he or she wants the progress of that gaming session to be saved for future gaming sessions, especially where future play under the selected bonus game is desired at other gaming machines. Alternatively, it may be possible to consider one gaming session as an ongoing persistent bonus game, in that the same persistent bonus game can be continued from one distinct play of the gaming machine to the next. However, such a use significantly limits many of the desirable features that are available under a persistent bonus game system that can continue from one gaming session to another and persist to multiple machines and gaming properties.

Although the example of a baseball World Series theme has been given, it is contemplated that other persistent bonus game themes may also be used. Such other persistent bonus game themes can include other sports themes, such as, for example, football, basketball, hockey, golf, tennis, auto racing, horse racing and the like. A player may play such a themed bonus game that similarly keeps track of the play from previous bonus game plays and awards, and allows the player to advance in a way similar to the actual sports game or series. For example, a bonus game may consist of an expanded season of baseball, whereby each time a specific player plays the bonus game, that player has an opportunity to establish and build upon a record of wins and losses. Eventually, a continued favorable record of wins and losses could enable that given player to proceed into the baseball playoffs and possibly the World Series. Other persistent bonus game themes may start the player in the World Series, such that sustained season long and/or playoff play is not required. Another example might comprise the game of football, whereby a player plays enough games with his or her "team" to enter the playoffs and possibly the Super Bowl. Again, under such a bonus theme, there may be immediate or instant wins as well as long term themed wins. For example, a first down, safety, field goal or touchdown may only comprise an instant win, while a game win, playoff qualification or Super Bowl win could comprise a long term themed win.

Alternatively, a persistent game theme could comprise an arcade type game, such as throwing coins on lily pads in a pond, a shooting gallery, bowling or nine-pins, ping-pong, a treasure hunt, a road trip, an antique road show, and other such alternative game themes. Other such games could involve a progressive "whodunit," such as a murder mystery, a progressive story theme tied to a popular book, television or movie franchise, or other similar themes suitable for savable and continuing progressive bonus game play. In these and other similar persistent bonus game themes, any given player might enjoy and/or be familiar with various details of the theme or concept, and thus be enticed to return to play again or play more frequently.

Under any such sports themed persistent bonus game, alternatively themed persistent bonus game, or merely a persistent bonus game with no particularized theme, any ongoing results for a given player are preferably saved or recorded at a centralized bonus system host or database. Referring back to FIG. 4, it can be seen that persistent bonus game results for a number of different persistent themed bonus games can be saved for any given player. As illustrated, Player A has registered with the bonus game system or host, and preferably under an existing player tracking system as well, and thus has a player number, registration date, and other pertinent details associated with his player persistent bonus game account. This player has also played under and had results stored for at least three separate persistent themed bonus games, with those being a "Baseball World Series" game, a "Formula 1 Challenge" game, and a "DungeonMaster" game. Of course, other games and game themes may be available, and results for such additional games may also be stored under the account of Player A. In addition, the "Saved Progress" for each game may involve data identifiers or simply comprise data strings. Such data can be extended or involve more information for any given game, depending upon the complexity of the game, and may include previous discrete game session results, as well as past prizes awarded. In fact, for purposes of simplicity, only a small sample of what might be deemed pertinent and thus stored within the database is actually illustrated for each game.

It is also contemplated that the saved or ongoing performance of one or more specific players within a given bonus game theme be communicated to other players within that bonus game theme through a mechanism such as a leader board or report sheet. Such saved and ongoing performance levels, statuses and achievements are thus tracked by a central host or database, such as bonus host 90 and database 150, and updates can be communicated to various players through any number of means. Accordingly, additional files (not shown) within database 150 may comprise a leader board or similar style report sheet. Updates of leaders in various categories within the game theme can be sent upon request to a given player, or can be provided in automated fashion, as desired. Display of such information can be had directly on a given gaming machine or player tracking device, on a separate leader board dedicated to persistent themed bonus game play, via direct mailings to interested players, on the Internet, or through any other display means or mechanism deemed appropriate. Examples of such tracked stats or levels could include, for example, in the case of an extended baseball season, overall win-loss records, most home runs, most runs scored, most strikeouts, most shutouts and the like. Such a leader board feature ultimately enables players to play against each other for the best performance record, which could result in increased or additional bonus games or prizes for designated record breakers or high achievers.

Improved Pay Table Awards

In yet another embodiment of the present invention, which may include some or all aspects of one or more of the foregoing embodiments, a particular type of prize, award or reward is contemplated. Such an award or reward may be available as a result of an immediate or instant win, a long term themed win, or both, as these items are described above. This award or reward involves the use of variable pay tables for the regular play of one or more gaming machines, such that various awards or rewards can be structured to benefit a given player with more favorable pay tables for a given gaming machine or group of gaming machines and/or a set period of time. For example, if the ordinary pay table for a given gaming machine awards 10 coins for 3 cherries on a pay line, then a pay table that has been altered due to a persistent bonus game award for a player at that gaming machine might award 20 coins for the same 3 cherries on a pay line. At the same time, other items in the regular play pay table may be similarly improved, such as for three bells, three bars, or three sevens, among others. Alternatively, improved pay tables for a "video poker" or other similar game may similarly be granted or awarded to a given player based upon play within the bonus system. Such a variable video poker pay table may increase from a standard 7/5 pay structure for full houses and flushes to a more player friendly 8/5 pay structure once a bonus award has been given, for example. Other such examples of improved or more favorable pay tables granting better odds to a given player for regular game play on the gaming machine will be readily apparent to those skilled in the art.

Figure 7A:
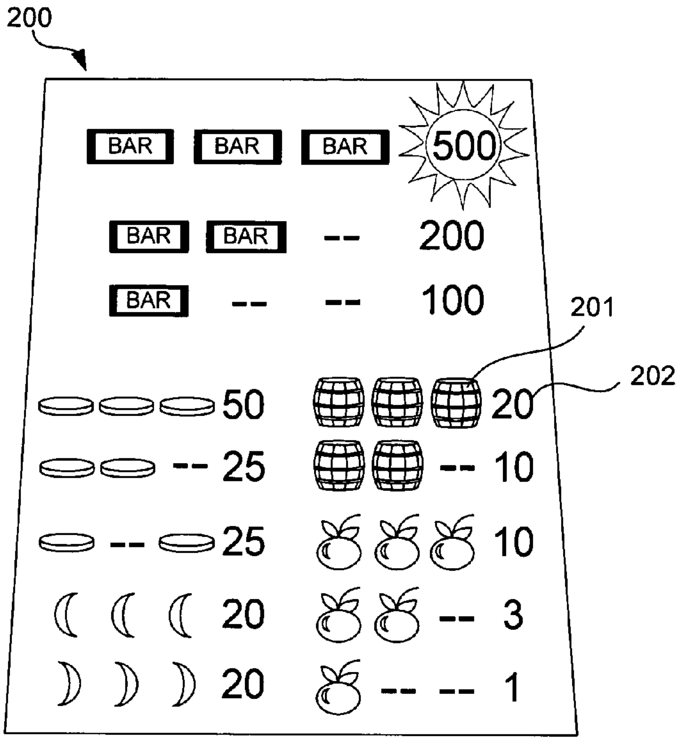
FIG. 7A illustrates a diagram of an exemplary standard pay table for regular play at a given gaming machine according to one embodiment of the present invention.
Figure 7B:
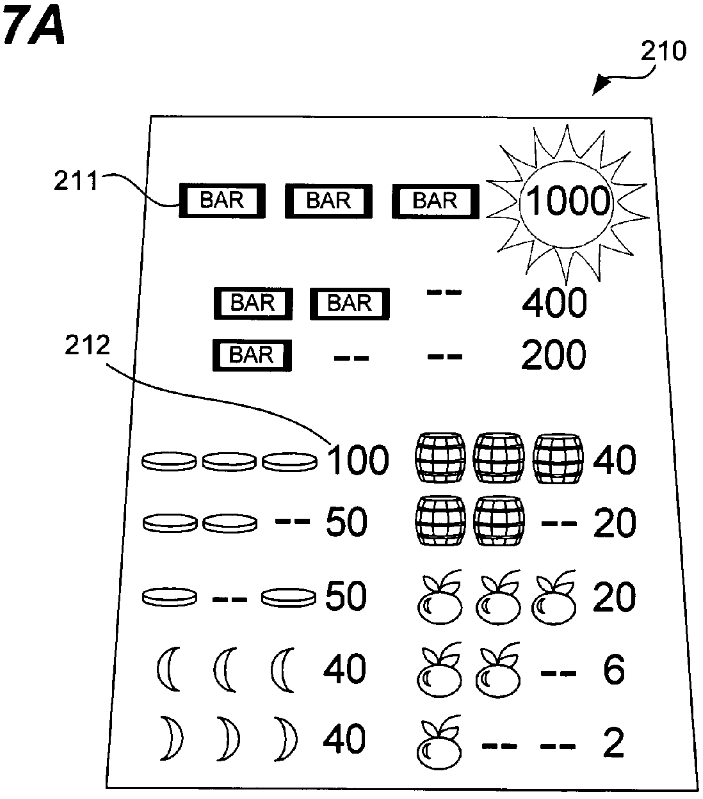
FIG. 7B illustrates a diagram of an exemplary improved pay table for regular play at a given gaming machine awarded under a bonus game according to one embodiment of the present invention.

Turning now to FIGS. 7A and 7B, diagrams of exemplary standard and improved pay tables for regular play at a given gaming machine according to one embodiment of the present invention are illustrated. Standard pay table 200 comprises various payouts for various winning outcomes of regular play on a gaming machine, such as either of gaming machines 10 or 20 as described above. In this particular pay table 200, it is assumed that a game of "slots" or a similarly situated game comprising three wheels or locations is being played at the gaming machine, whereby any given game outcome comprises three symbols or items on a given pay line. As shown in FIG. 7A, various symbols 201 can be arranged in particular combinations to result in various standard awards 202 of a specific number of coins or credits for any given regular play on the gaming machine, as will be readily understood by those skilled in the art. Various other types and forms of symbols, pay lines, and payout amounts and structures are well known in the art, and it will be readily appreciated that all such instances of symbols, pay lines and payout amounts and structures can be used in conjunction with the present invention.

As shown in FIG. 7A, standard pay table 200 comprises a fixed award 202 for any given combination of symbols or items, with a maximum award or "jackpot" being awarded for three bars, and a smallest award of one coin or credit being awarded for one cherry followed by any two other symbols. Such other symbols can be any of the other symbols depicted in the pay table, as well as other symbols that may be in the game but not specifically within any given award payout. Of course, a minimum win or award would be no win or nothing in the event that one of the specified payout awards is not achieved during a regular play of the gaming machine. Referring now to FIG. 7B, an improved pay table 210 shows various improved payout awards for regular play of the same gaming machine. Various symbols 211 can be similarly arranged in particular combinations to result in various improved awards 212 of a specific number of coins or credits for any given regular play on the gaming machine. As shown, each of symbols 211 and the resulting payout structure are substantially similar to those given for standard pay table 200. However, each of the improved awards or payouts 212 in improved pay table 210 is doubled with respect to the corresponding awards 202 in standard pay table 210. The odds for this altered pay table thus comprise player odds that are more favorable to the player than the odds for the original pay table. Additional embodiments and details of implementing a variable pay table for regular game play on a gaming machine can be found in, for example, commonly assigned U.S. Pat. No. 6,468,156 to Baird, et al., which reference is incorporated herein in its entirety and for all purposes.

Of course, it is not necessary for such an improved pay table to have improved payouts at exactly double the rate of the original standard pay table. Such improved payouts could be set, for example, at triple, quadruple, ten times or one hundred times the rate of the original standard payouts. Alternatively, the improved payouts could be merely incrementally improved over the original standard payouts, such as by a 10% improvement or by adding one or two coins or credits to each payout. Of course, such an incremental improvement can consist merely of the upgrading of a video poker pay table from a 7/5 pay table to an 8/5 pay table, as discussed previously. Conversely, it is even possible to vary the pay table such that the payouts are slightly worse than the original standard payouts. Such an adjustment would likely be complex in some way, so as not to discourage a player from continuing to play, and would also need to avoid running afoul of various gaming regulations regarding minimum payouts and appropriate payout disclosures for gaming machines.

Such an improved pay table may also award payouts or awards for one or more given regular game outcomes that were previously not winners. For example, as shown in FIGS. 7A and 7B, a single quarter moon does not win any award or payout. Under an improved pay table, however, such an outcome may result in award of a certain amount of coins or credits. Furthermore, while an improved pay table is preferably specific to a given player according to the status, level and/or a specific achievement of that player within the bonus system, the improved pay table can also be temporal in nature, rather than permanent. For example, where a given player has achieved an improved pay table for regular game play as a specific bonus award, that improved pay table may only be available to that given player for a set amount of time or finite number of future regular game plays. Hence, an excessively improved pay table can be awarded without a significant loss or risk to the casino or gaming operator, since such an excessively improved pay table may only be available, for example, for one minute or one regular play on the gaming machine.

Using one or more of the foregoing and other additional variables in combination, it is possible to arrive at a wide variety of varying payouts, pay structures, and pay tables that can be implemented for one game play instance or many over a wide variety of times. In this manner, a vast array of improved pay table bonus awards of varying levels can be granted to a given player. It is specifically contemplated that such an improved pay table be awarded as a particular bonus within a bonus system or method, and preferably as part of a persistent and/or themed bonus system or method. In particular, it is contemplated that an improved pay table be awarded based upon a particular player and the standing, level, or particular achievement of that player within a persistent bonus system. For example, a player that has played through a regular baseball season and achieved a spot in a baseball playoff series may be awarded an improved pay table on one or more gaming machines that is significantly improved over the standard pay table, and given the status of playing a full baseball season and making the playoffs within the bonus game, such an improved pay table may be available to the player for a period of days or weeks. At a lesser degree, an "instant" or immediate win at a bonus game might result in a slightly improved pay table that is available to the given player for the next few plays or minutes at the gaming machine.

Other varying degrees and implementations of improved or varied pay tables may also be used in conjunction with the present invention, such as through a formula that awards incrementally better pay tables based upon incrementally increased play or achievements by a given player under the bonus system or method. Again, such improved bonus table awards can be made during a single ongoing gaming session by a given player, or across multiple gaming sessions under a persistent bonus award system or method. For example, once a given player has played under the bonus system at a given gaming machine for one hour, an improved pay table granting awards at a 5% higher payout rate than the original standard payout table may be awarded. At each additional 15-minute increment of play by that player at the gaming machine, an additional 1% can be added to the payout rate under a new improved payout table. As in the foregoing examples, such an increase can be made across the board for all payout awards, or might only be granted for a select number of payout awards. For instance, one 1% increment might only be made for all awards having a "bar" in them, while a subsequent 1% or 5% increment might be made only for all awards having a barrel in them. Alternatively, additional payouts for combinations that were previously not winners may be awarded at certain milestones, as previously described.

In some gaming jurisdictions and localities, it may be unlawful or otherwise impractical to alter or adjust a base pay table for regular play on a gaming machine. In such cases, the present embodiment may still be implemented, albeit under a slightly different structure. Here, the award of an improved pay table might simply comprise a "bonus pay table" in addition to a fixed pay table for regular game play, which fixed table must be the same at all times. In this manner, the regular "base" payouts remain constant at all times for regular game play, and any bonus payouts are awarded under a tacked-on bonus pay table. In the foregoing detailed illustration, for example, it can be said that the "base" pay table of FIG. 7A remains in effect at all times, and that the "bonus" pay table of FIG. 7B, or some fraction or multiple thereof, is merely tacked onto the base pay table of FIG. 7A at such times that a bonus or improved pay table is awarded. Additional discussion and examples of such adjustable pay tables requiring the use of a constant "base" pay table at all times can be found in for example, commonly owned U.S. Pat. No. 5,655,961 to Acres, et al., which reference is incorporated herein in its entirety and for all purposes.

Although the foregoing invention has been described in detail by way of illustration and example for purposes of clarity and understanding, it will be recognized that the above described invention may be embodied in numerous other specific variations and embodiments without departing from the spirit or essential characteristics of the invention. Certain changes and modifications may be practiced, and it is understood that the invention is not to be limited by the foregoing details, but rather is to be defined by the scope of the appended claims.

What is claimed is:

1. A bonus system associated with a gaming system including at least a first gaming machine adapted for accepting wagers, granting monetary awards and presenting a game for regular and bonus play by a player thereon, said bonus system comprising:

a player tracking device associated with said first gaming machine, said player tracking device including at least one input configured to receive information regarding said player of said first gaming machine;

a display device associated with said first gaming machine, said display device adapted to present bonus information to said player of said first gaming machine;

a bonus system host, said bonus system host arranged to accept information regarding said player of said first gaming machine from said player tracking device and transmit bonus information for display at said display device;

a bonus processor associated with said first gaming machine and said bonus system host, said bonus processor adapted to generate bonus event results from play of a bonus game resulting from play of a first regular game, at least a portion of said bonus event results being substantially dependent upon the identity or another traceable characteristic of said player of said first gaming machine; said bonus event results comprising:

results of incremental bonus game play wherein said bonus event results for said player persist to a following instance that said player plays a regular game on a gaming machine associated with said bonus system for play at a later time and/or different location, and said processor is further adapted to apply said bonus event results that persist to play of a bonus game that is awarded from regular game play in said following instance, said bonus game dependent upon said bonus event results;

a communications link between said player tracking device and said bonus system host, said communications link adapted to transmit information between said player tracking device and said bonus system host.

2. The bonus system in accordance with claim 1, wherein said player tracking device includes a player tracking controller located at said first gaming machine, said player tracking controller adapted to execute bonus event instructions received from said bonus system host.

3. The bonus system in accordance with claim 1, wherein said communications link comprises a portion of a communication network.

4. The bonus system in accordance with claim 3, wherein a plurality of player tracking devices associated with a plurality of gaming machines are each associated with said bonus system host.

5. The bonus system in accordance with claim 1, wherein said bonus system is adapted to generate information regarding a bonus event independent of the outcome of a game presented on said first gaming machine.

6. The bonus system in accordance with claim 1, wherein said persistent bonus event results comprise an altered pay table with respect to the outcome of a regular game playing during said following instance.

7. The bonus system in accordance with claim 6, wherein said altered pay table comprises player odds that are more favorable to said player.

8. The bonus system in accordance with claim 7, wherein said more player favorable player odds are calculated as a function of the amount of play that said player has played within said bonus system.

9. The bonus system in accordance with claim 6, wherein said altered pay table comprises a base pay table and a bonus pay table added to the base pay table.

10. The bonus system in accordance with claim 1, wherein said bonus system host comprises a database arranged to store data regarding the activities of one or more players of said gaming machine.

11. The bonus system in accordance with claim 1, wherein said display device is located at said first gaming machine.

12. The bonus system in accordance with claim 1, wherein said bonus processor is located at said bonus system host.

13. The bonus system in accordance with claim 1, wherein said player tracking device comprises a ticket reader and a ticket printer.

14. A method of awarding a bonus to a player of a first gaming machine, comprising:

providing a bonus host at a location remote from said first gaming machine, said bonus host adapted to process and store information specific to said player;

providing one or more communications links adapted to transmit information between said first gaming machine and said bonus host;

accepting information regarding said player of said first gaming machine;

transmitting bonus event information from said bonus host to said first gaming machine over said one or more communications links;

generating bonus event results, said bonus event results comprising results of incremental bonus game play from play of a bonus game resulting from play of a first regular game, at least a portion of said bonus game results being substantially dependent upon the identity of said player of said first gaming machine; and presenting said bonus event results at said first gaming machine and continuing said bonus event results for said player to a following instance that said player plays a bonus game awarded from play of a regular game on a gaming machine associated with said bonus system for play at a later time and/or different location.

15. The method in accordance with claim 14, wherein said continued bonus event results comprise an altered pay table with respect to the outcome of a regular game playing during said following instance.

16. A gaming machine adapted for accepting wagers, granting monetary awards, presenting a game for play by a player thereon, and awarding bonuses associated with a bonus system, comprising:

at least one input configured to receive information regarding said player of said gaming machine;

a display device adapted to present bonus information to said player of said gaming machine;

a bonus processor arranged to accept information regarding said player of said gaming machine from said at least one input, generate bonus event results from bonus game play of bonus game resulting from play of a first regular game, said bonus event results comprising results of incremental bonus game play wherein said bonus event results for said player persist to a following instance that said player plays a regular game on a gaming machine associated with said bonus system for play at a later time and/or different location, and transmit bonus information for display at said display device, wherein at least a portion of said bonus event results are substantially dependent upon the identity of said player of said gaming machine; and a communications link between said at least one input and said bonus processor, said communications link adapted to transmit information between said at least one input and said bonus processor.

17. The gaming machine in accordance with claim 16, wherein said persistent bonus event results comprise an altered pay table with respect to the outcome of a regular game playing during said following instance.

18. The gaming machine in accordance with claim 17, wherein said altered pay table comprises player odds that are more favorable to said player.

19. A bonus system associated with a gaming system including at least a first gaming machine adapted for accepting wagers, granting monetary awards and presenting a game for play by a player thereon, said bonus system comprising:

a player tracking device associated with said first gaming machine, said player tracking device including at least one input configured to receive information regarding said player of said first gaming machine;

a display device associated with said first gaming machine, said display device adapted to present bonus information to said player of said first gaming machine;

a bonus system host, said bonus system host arranged to accept information regarding said player of said first gaming machine from said player tracking device and transmit bonus information for display at said display device;

a bonus processor associated with said first gaming machine and said bonus system host, said bonus processor adapted to generate bonus event results comprising an altered pay table with respect to the outcome of a bonus game playing during a following instance that said player plays a bonus game that is awarded from regular game play on a gaming machine associated with said bonus system at a later time and/or different location, wherein the generation of said bonus event results are substantially dependent upon the identity of said player of said first gaming machine; and a communications link between said player tracking device and said bonus system host, said communications link adapted to transmit information between said player tracking device and said bonus system host.

20. A gaming machine adapted for accepting wagers, granting monetary awards, presenting a game for play by a player thereon, and awarding bonuses associated with a bonus system, comprising:

at least one input configured to receive information regarding said player of said gaming machine;

a display device adapted to present bonus information to said player of said gaming machine;

a bonus processor arranged to accept information regarding said player of said gaming machine from said at least one input, generate bonus event results comprising an altered pay table with respect to the outcome of a bonus game playing during a following instance that said player plays a bonus game that is awarded from regular game play on a gaming machine associated with said bonus system at a later time and/or different location, and transmit bonus information for display at said display device, wherein the generation of said bonus event results are substantially dependent upon the identity of said player of said gaming machine; and a communications link between said at least one input and said bonus processor, said communications link adapted to transmit information between said at least one input and said bonus processor.

* * * * *